United States Patent
Lee et al.

(10) Patent No.: US 12,074,636 B2
(45) Date of Patent: Aug. 27, 2024

(54) METHOD FOR TRANSMITTING AND RECEIVING SIGNAL IN OPTICAL WIRELESS COMMUNICATION SYSTEM, AND TRANSMISSION TERMINAL AND RECEPTION TERMINAL THEREFOR

(71) Applicant: LG ELECTRONICS INC., Seoul (KR)

(72) Inventors: Hojae Lee, Seoul (KR); Sangrim Lee, Seoul (KR); Kijun Jeon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 290 days.

(21) Appl. No.: 17/596,854

(22) PCT Filed: Jun. 28, 2019

(86) PCT No.: PCT/KR2019/007883
§ 371 (c)(1),
(2) Date: Dec. 20, 2021

(87) PCT Pub. No.: WO2020/262743
PCT Pub. Date: Dec. 30, 2020

(65) Prior Publication Data
US 2022/0321213 A1  Oct. 6, 2022

(51) Int. Cl.
*H04B 10/079* (2013.01)
*G01S 13/06* (2006.01)
(Continued)

(52) U.S. Cl.
CPC ....... *H04B 10/07953* (2013.01); *H04B 10/40* (2013.01); *G01S 13/06* (2013.01); *H04B 10/116* (2013.01)

(58) Field of Classification Search
CPC .......... H04B 10/07953; H04B 10/40; H04B 10/116; G01S 13/06; G01S 13/86; G01S 17/86; G01S 7/003
(Continued)

(56) References Cited

U.S. PATENT DOCUMENTS 9,077,577 B1 * 7/2015 Ashrafi ................ H04J 14/06
9,240,956 B2 * 1/2016 Chen ..................... H04L 25/14
(Continued)

FOREIGN PATENT DOCUMENTS

CN  103918334 A * 7/2014 .......... H04W 72/541
CN  104821875 A * 8/2015
(Continued)

OTHER PUBLICATIONS

PCT International Application No. PCT/KR2019/007883, International Search Report dated Mar. 27, 2020, 11 pages.
(Continued)

*Primary Examiner* — Abbas H Alagheband
(74) *Attorney, Agent, or Firm* — LEE, HONG, DEGERMAN, KANG & WAIMEY

(57) ABSTRACT

A method by which a transmission terminal transmits a signal in an optical wireless communication system can comprise: transmitting a first optical signal including a reference signal to a reception terminal having established a communication link with the transmission terminal; receiving feedback information about the first optical signal from the reception terminal; and transmitting a second optical signal to the reception terminal on the basis of the feedback information, wherein an orbital angular momentum (OAM) mode of the second optical signal can be selected on the basis of the feedback information.

12 Claims, 38 Drawing Sheets

(51) Int. Cl.
*H04B 10/116* (2013.01)
*H04B 10/40* (2013.01)

(58) Field of Classification Search
USPC .......................................................... 398/25
See application file for complete search history.

(56) References Cited

U.S. PATENT DOCUMENTS

| | | | | |
|---|---|---|---|---|
| 11,709,231 | B2* | 7/2023 | Yoo | G01C 9/00 |
| | | | | 356/5.01 |
| 2009/0310978 | A1* | 12/2009 | Uemura | H04B 10/801 |
| | | | | 398/189 |
| 2015/0349910 | A1* | 12/2015 | Huang | H04J 14/04 |
| | | | | 398/44 |
| 2016/0123877 | A1* | 5/2016 | Cvijetic | G01S 7/4802 |
| | | | | 356/300 |
| 2017/0187442 | A1* | 6/2017 | Luddy | H04B 10/0773 |
| 2017/0230115 | A1* | 8/2017 | Ashrafi | H04B 10/516 |

FOREIGN PATENT DOCUMENTS

| | | |
|---|---|---|
| EP | 3163766 | 5/2017 |
| KR | 10-2019-0043080 | 4/2019 |

OTHER PUBLICATIONS

Li et al., "Adaptive power-controllable orbital angular momentum (OAM) multicasting," Scientific Reports vol. 5, Article No. 9677, May 2015, 9 pages.

* cited by examiner

Figure 9-Schematic mechanism for VPPM dimming

METHOD FOR TRANSMITTING AND RECEIVING SIGNAL IN OPTICAL WIRELESS COMMUNICATION SYSTEM, AND TRANSMISSION TERMINAL AND RECEPTION TERMINAL THEREFOR

CROSS-REFERENCE TO RELATED APPLICATIONS

This application is the National Stage filing under 35 U.S.C. 371 of International Application No. PCT/KR2019/007883, filed on Jun. 28, 2019, the contents of which is hereby incorporated by reference herein in its entirety.

TECHNICAL FIELD

The present disclosure relates to a method of transmitting and receiving a signal in an optical wireless communication system and transmitting and receiving user equipments (UEs) therefor, and more particularly, a method of transmitting and receiving a signal including adaptive adjustment of orbital angular momentum (OAM).

BACKGROUND ART

Optical wireless communication systems may be largely divided into visible light communication (VLC) systems and free-space optical (FSO) communication systems according to the frequency and purpose of photons.

VLC plays the role of lighting and communication at the same time. Information is transmitted by visible light, which may depend on the intensity of the light or the blinking of the light. To this end, visible light devices such as a light emitting diode (LED) is commonly used.

FSO communication mainly plays the role of communication and is usually used in a free space environment or an environment where signal straightness is guaranteed. The FSO communication also covers ultraviolet (UV) and infrared (IR) light as well as visible light. Unlike VLC, FSO communication is not involved in lighting, so there are no restrictions on lighting. In general, not only LEDs but also devices based on the straightness of light such as light amplification by stimulated emission of radiation (LASER) are used.

In conventional data transmission and reception based on optical wireless communication, it may be difficult to guarantee the decoding performance of a receiver due to the influence of an external interference light source. In particular, interference from strong sunlight may significantly reduce the decoding performance of the receiver. Therefore, there is a need for a signal transmission and reception method for optical wireless communication that is robust to external interference.

DISCLOSURE

Technical Problem

The object of the present disclosure is to provide a method of transmitting and receiving a signal in an optical wireless communication system that allows to guarantee the decoding performance of a receiving user equipment (UE) regardless of the influence of an external interference light source in order to solve the above problems.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of transmitting a signal by a transmitting user equipment (UE) in an optical wireless communication system is provided. The method may include: transmitting a first optical signal including a reference signal to a receiving UE with a communication link established with the transmitting UE; receiving feedback information on the first optical signal from the receiving UE; and transmitting a second optical signal to the receiving UE based on the feedback information. In this case, an orbital angular momentum (OAM) mode of the second optical signal may be selected based on the feedback information.

The feedback information may include a radius of an area in which a desired signal is detected in a photodiode array of the receiving UE, and the OAM mode of the second optical signal may be selected based on the radius of the area.

In another aspect of the present disclosure, a method of transmitting a signal by a transmitting UE in an optical wireless communication system is provided. The method may include: transmitting a first optical signal including a reference signal to a receiving UE with a communication link established with the transmitting UE; measuring a distance to the receiving UE with a distance measurement sensor; selecting an OAM mode of a second optical signal based on the measured distance; and transmitting the second optical signal to the receiving UE.

The distance measurement sensor may include radio detection and ranging (RADAR) or light detection and ranging (LIDAR).

In another aspect of the present disclosure, a method of receiving a signal by a receiving UE in an optical wireless communication system is provided. The method may include: receiving a first optical signal including a reference signal from a transmitting UE with a established communication link; transmitting feedback information on the first optical signal to the transmitting UE; and receiving a second optical signal based on the feedback information from the transmitting UE.

The feedback information may be generated based on measuring a radius of a photodiode array area in which a desired signal is detected with respect to reference coordinates of a photodiode array.

The feedback information may be generated based on further measuring a radius of a photodiode array area in which an interference signal is detected with respect to the reference coordinates of the photodiode array.

The feedback information may include requesting an increase or decrease in an OAM mode index of the first optical signal.

Advantageous Effects

A method of transmitting and receiving a signal in an optical wireless communication system according to an aspect of the present disclosure may remove or mitigate interference from an interference optical source including sunlight.

A method of transmitting and receiving a signal in an optical wireless communication system according to another aspect of the present disclosure may improve the reception efficiency of a receiving user equipment (UE) by i) adaptively changing an orbital angular momentum (OAM) mode based on feedback from the receiving UE or ii) adaptively changing the OAM mode based on sensing of the receiving UE performed by a transmitting UE.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the present disclosure and are incorporated in and constitute a part of this specification, illustrate embodiments of the disclosure and together with the description serve to explain the principles of the disclosure.

BEST MODE

Figure 1:
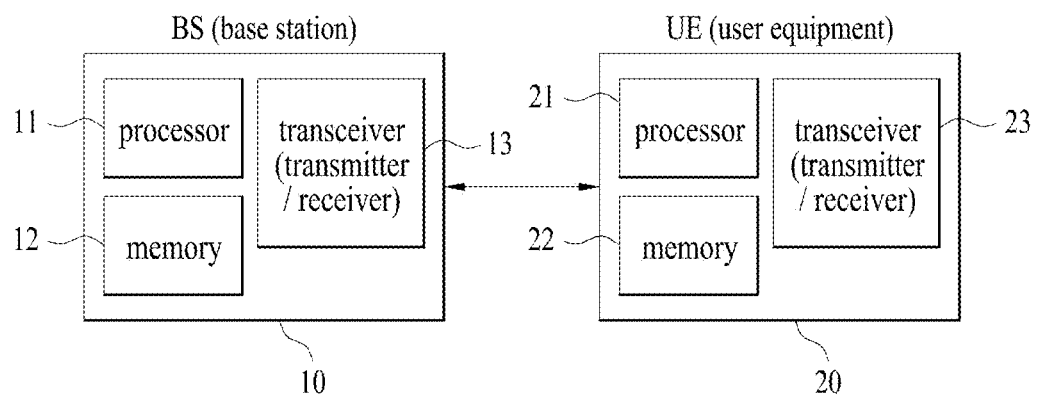
FIG. 1 is a diagram illustrating an exemplary system for implementing the present disclosure.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes the 3GPP LTE and LTE-A and 5G systems, the following descriptions are applicable to other random mobile communication systems by excluding unique features of the 3GPP LTE and LTE-A systems.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. In addition, assume that a base station (BS) is a common name of such a random node of a network stage communicating with a terminal as a Node B (NB), an eNode B (eNB), an access point (AP) and the like.

In a mobile communication system, a UE can receive information from a BS in downlink and transmit information in uplink. The UE can transmit or receive various data and control information and use various physical channels depending types and uses of its transmitted or received information.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE Moreover, in the following description, specific terminologies are provided to help the understanding of the present disclosure. And, the use of the specific terminology can be modified into another form within the scope of the technical idea of the present disclosure.

FIG. 1 is a diagram illustrating a system for implementing the present disclosure.

Referring to FIG. 1, a wireless communication system includes a BS 10 and one or more UEs 20. On downlink (DL), a transmitter may be a part of the BS 10 and a receiver may be a part of the UE 20. On uplink (UL), the BS 10 may include a processor 11, a memory 12, and a radio frequency (RF) unit 13 (transmitter and receiver). The processor 11 may be configured to implement the proposed procedures and/or methods disclosed in the present application. The memory 12 is coupled to the processor 11 to store a variety of information for operating the processor 11. The RF unit 13 is coupled to the processor 11 to transmit and/or receive radio signals. The UE 20 may include a processor 21, a memory 22, and an RF unit 23 (transmitter and receiver). The processor 21 may be configured to implement the proposed procedures and/or methods disclosed in the present application. The memory 22 is coupled to the processor 21 to store a variety of information for operating the processor 21. The RF unit 23 is coupled to the processor 21 to transmit and/or receive radio signals. The BS 10 and/or the UE 20 may include a single antenna and multiple antennas. If at least one of the BS 10 or the UE 20 includes multiple antennas, the wireless communication system may be called a multiple input multiple output (MIMO) system.

In the present specification, although the processor 21 of the UE and the processor 11 of the BS perform an operation of processing signals and data, except for a function of receiving or transmitting signals and a function of storing signals, the processors 11 and 21 will not be especially mentioned for convenience of description. Even though the processors 11 and 21 are not particularly mentioned, it may be said that the processors 11 and 21 perform operations of processing data except for a function of receiving or transmitting signals.

The present disclosure proposes various new frame structure for a 5$^{th}$ generation (5G) communication system. In the next generation 5G system, communication scenarios are classified into Enhanced Mobile Broadband (eMBB), Ultra-reliability and low-latency communication (URLLC), Massive Machine-Type Communications (mMTC), etc. Here, eMBB is the next generation mobile communication scenario having such properties as High Spectrum Efficiency, High User Experienced Data Rate, High Peak Data Rate and the like, URLLC is the next generation mobile communication scenario having such properties as Ultra Reliable, Ultra Low Latency, Ultra High Availability and the like (e.g., V2X, Emergency Service, Remote Control), and mMTC is the next generation mobile communication scenario having such properties as Low Cost, Low Energy, Short Packet, Massive Connectivity and the like (e.g., IoT).

Figure 2:
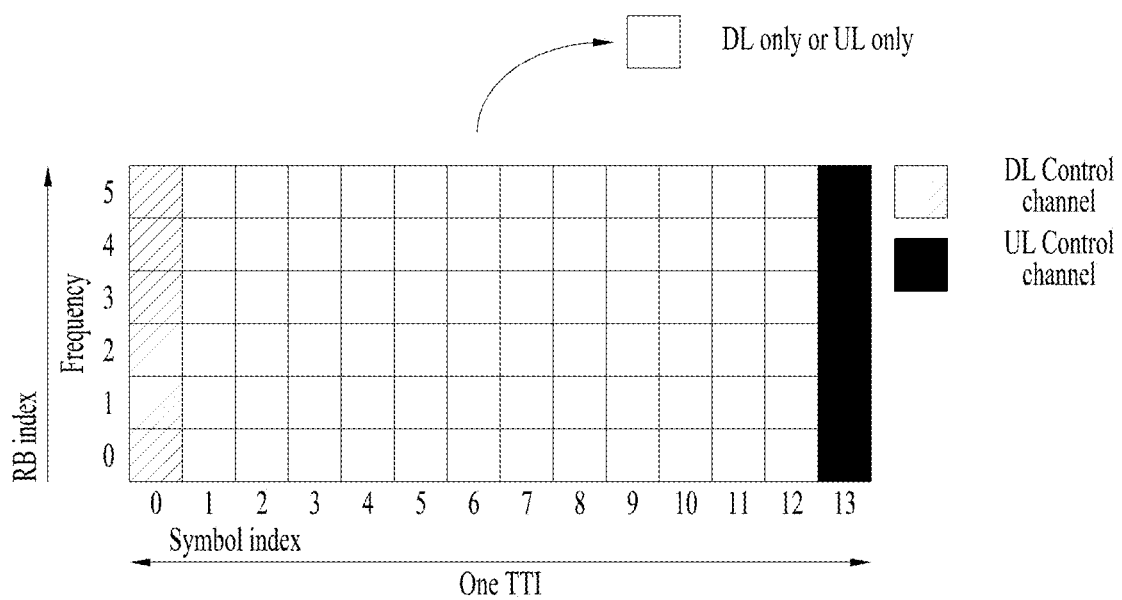
FIG. 2 is a diagram illustrating an exemplary subframe structure in which a data channel and a control channel are multiplexed in time division multiplexing (TDM)

FIG. 2 is a diagram illustrating an exemplary subframe structure in which a data channel and a control channel are multiplexed in time division multiplexing (TDM). In 5G NR, a frame structure in which a control channel and a data channel are multiplexed according to TDM like FIG. 2 may be considered in order to minimize latency.

In FIG. 2, the hatched area represents a transmission region of a DL control channel carrying DCI (e.g., PDCCH), and the last symbol represents a transmission region of a UL control channel carrying UCI (e.g., PUCCH). Here, the DCI is control information transmitted from a gNB to a UE and may include information on a cell configuration the UE should know, DL-specific information such as DL scheduling, UL-specific information such as a UL grant, etc. The UCI is control information transmitted from the UE to the gNB and may include a HARQ ACK/NACK report on DL data, a CSI report on a DL channel state, a scheduling request (SR), etc.

In FIG. 2, blank areas are available for flexible configuration of DL or UL periods to achieve DL/UL flexibility. For example, a blank area may be used as a data channel for DL data transmission (e.g., a physical downlink shared channel (PDSCH)) or a data channel for UL data transmission (e.g., a physical uplink shared channel (PUSCH)). This structure is characterized in that since a DL transmission and a UL transmission may be performed sequentially in one subframe, an eNB may transmit DL data in the subframe to a UE and receive an HARQ ACK/NACK signal for the DL data in the subframe from the UE. That is, the time required to retransmit data when a data transmission error occurs may be reduced, thereby minimizing the latency of final data transmission.

In the self-contained subframe structure, a time gap is necessary in order that the gNB and UE switch to a reception mode from a transmission mode, and vice versa. For the switching between the transmission mode and the reception mode, some OFDM symbols at the time of DL-to-UL switching may be configured as a guard period (GP) in the self-contained subframe structure.

Visible Light Communication (VLC)

Figure 3:
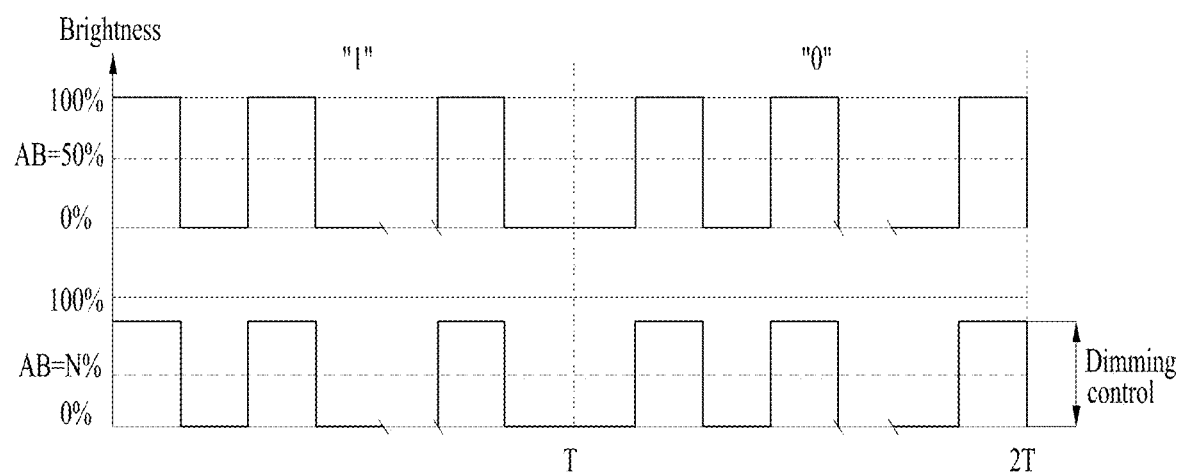
FIGS. 3 to 4 are diagrams illustrating single carrier modulation (SCM) for visible light communication.
Figure 4:
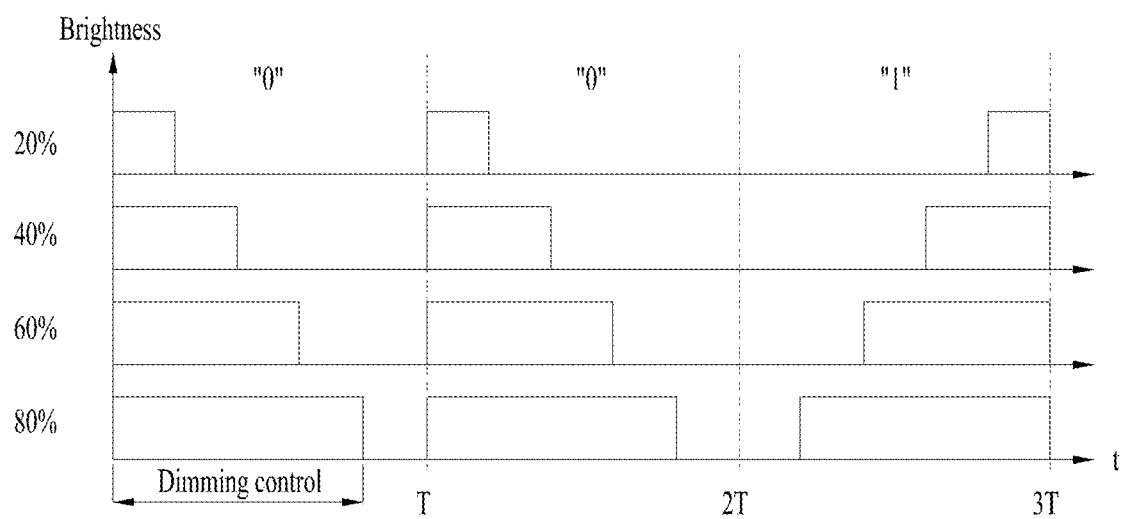

Generally, for a visible light systems, single carrier modulation (SCM) schemes based on on-off keying (OOK) for presenting signals based on flickering of visible light are provided. Referring to FIGS. 3 and 4, OOK modulation is a scheme of presenting digital signals 1 and 0 according to the ON and OFF of the light source. OOK modulation may be modified to methods such as pulse position modulation (PPM), which performs modulation into a pulse position based on a clock.

Regarding the visible light communication system, research on multi-carrier modulation (MCM) schemes have been conducted. Compared to the single carrier modulation scheme, the MCM scheme is robust to multipath, and enables operation of a single tap equalizer. It is also robust to DC wandering and flickering interference. The MCM-based waveform for VLC must satisfy the conditions that i) it has only one dimension (real-value) signal and ii) it has unipolar characteristics.

Figure 5:
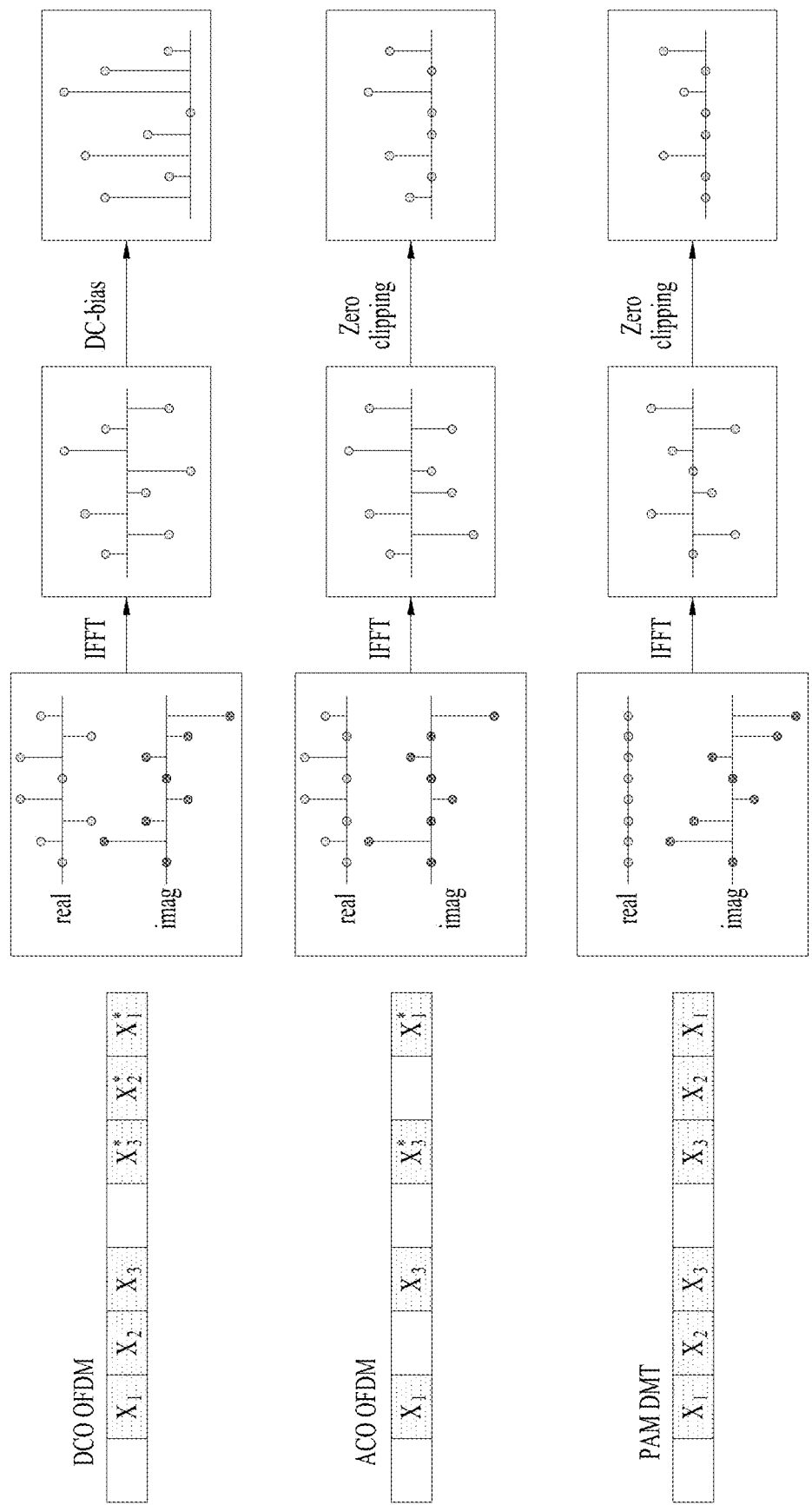
FIG. 5 is a diagram illustrating multi-carrier modulation (MCM) for visible light communication.

Various MCM schemes satisfying the above conditions have been introduced. These MCM schemes may be classified into DC-biased optical OFDM (DCO-OFDM), asymmetrically clipped optical OFDM (ACO-OFDM), and pulse-amplitude modulated discrete multi-tone modulation (PAM-DMT). These schemes will be described with reference to FIG. 5.

i) DCO-OFDM: This corresponds to the first subcarrier mapping of FIG. 5, in which modulated symbols are Hermitian symmetrically arranged. The Hermitian symmetric arrangement means arranging symbols in the form of conjugate so as to be symmetry with respect to the DC subcarrier as a boundary. In this arrangement method, a waveform in the time domain is transformed into a real value signal. Thereafter, a final unipolar time domain signal is created by biasing the transformed signal as much as the minimum value (i.e., negative value with maximum amplitude) in the time domain stage.

ii) ACO-OFDM: This corresponds to the second subcarrier mapping of FIG. 5. Half of the modulated symbols in DCO-OFDM are arranged Hermitian symmetrically at constant intervals. In this subcarrier mapping, a waveform in the time domain takes the form of a real value signal and is repeated with an inverted sign. Then, a final unipolar time domain signal is created by zero clipping the waveform that appears repeatedly as described above.

iii) PAM-DMT: This corresponds to the third subcarrier mapping of FIG. 5. In this scheme, a real value signal is placed in the imaginary part by flipping the same with respect to the center in the PAM fashion. In this subcarrier mapping, the waveform in the time domain takes the form of a real value signal and repeatedly appears in a symmetric form with an inverted sign. Similar to ACO-OFDM, a final unipolar time domain signal is created by performing zero clipping.

Table 1 describes the performance measure of each of the aforementioned schemes DCO-OFDM, ACO-OFDM and PAM-DMT. The performance measure may be, for example, spectral efficiency (SE), PAPR, signal-to-noise ratio (SNR), or bit error rate (BER).

TABLE 1

|  | SE | SNR | BER |
|---|---|---|---|
| DCO OFDM | ◯ | X | X |
| ACO OFDM | X | ◯ | ◯ |
| PAM DMT OFDM | X | ◯ | Δ |

Referring to Table 1, DCO-OFDM has half the SE for the Hermitian symmetry, but this may be seen as the most optimal SE in unipolar OFDM. However, in DCO OFDM, the SNR characteristic is deteriorated because a portion of the transmit power actually carried on the signal is small due to the bias (wherein the DC-bias value is a constant, and does not affect the performance of modulated symbol detection at the receiving side).

Referring to Table 1, ACO-OFDM has a disadvantage of having half SE of DCO OFDM. However, since DC bias is not required and the entire transmit power is carried on the desired signal, this scheme has a relatively good SNR characteristic.

Referring to Table 1, the PAM DMT has almost the same characteristics as the ACO OFDM. However, it is based on amplitude in one dimension, rather than using a quadrature complex symbol for modulation. Accordingly, the distance between symbols is reduced, and thus BER performance is lower than that in ACO OFDM.

Figure 6:
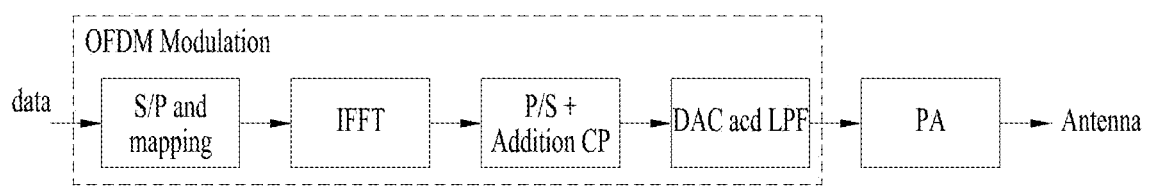
FIG. 6 is a diagram illustrating the OFDM modulation structure at the transmitting side of the conventional RF communication system.

FIG. 6 is a diagram illustrating the OFDM modulation structure at the transmitting side of the conventional RF communication system. Referring to FIG. 6, an analog signal obtained through OFDM modulation is amplified through an RF power amplifier (PA). In this case, the maximum amplified magnitude of the signal may be limited by the performance limit of the PA.

Figure 7:
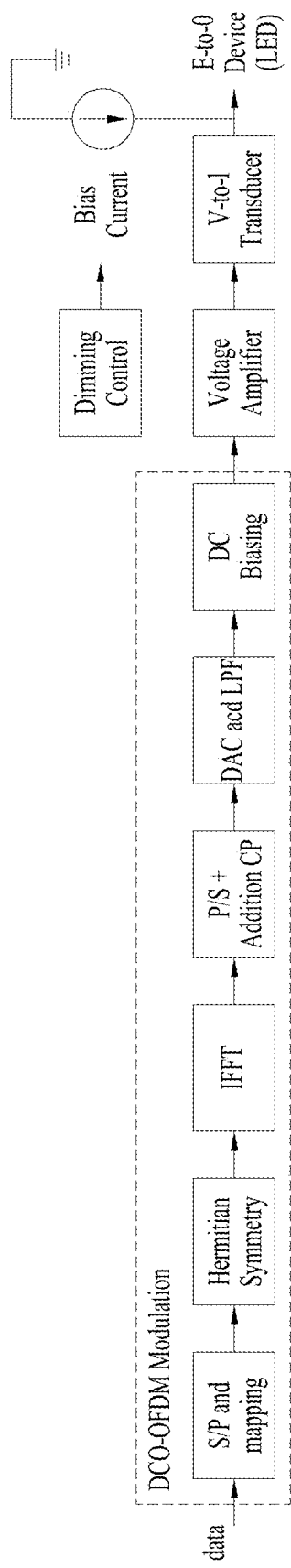
FIGS. 7 to 8 are diagrams illustrating the structure of a multi-carrier modulation transmitter of a visible light communication system.
Figure 8:
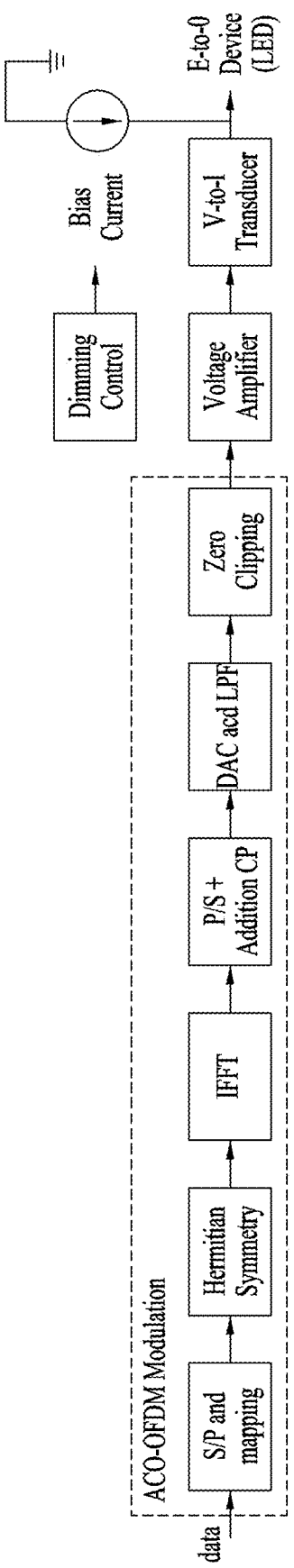

On the other hand, the structure of a multi-carrier modulation transmitter of the visible light communication system as shown in FIGS. 7 to 8. More specifically, FIG. 7 shows the structure of a DCO-OFDM modulation transmitter of the VLC communication system, and FIG. 8 shows the structure of an ACO-OFDM modulation transmitter of the VLC communication system.

Referring to FIGS. 7 to 8, a voltage amplifier, a voltage-to-current (V-to-I) transducer, and an electrical-to-optical (E-to-O) device (e.g., LED) all have non-linear characteristics. Therefore, an analog signal obtained through modulation is amplified and transformed. In FIGS. 7 to 8, dimming control through DC biasing is exemplified. In the case of the operation based on reverse polarity, dimming control may be performed through signal reconstruction.

Color-Shift Keying (CSK) Modulation

Figure 9:
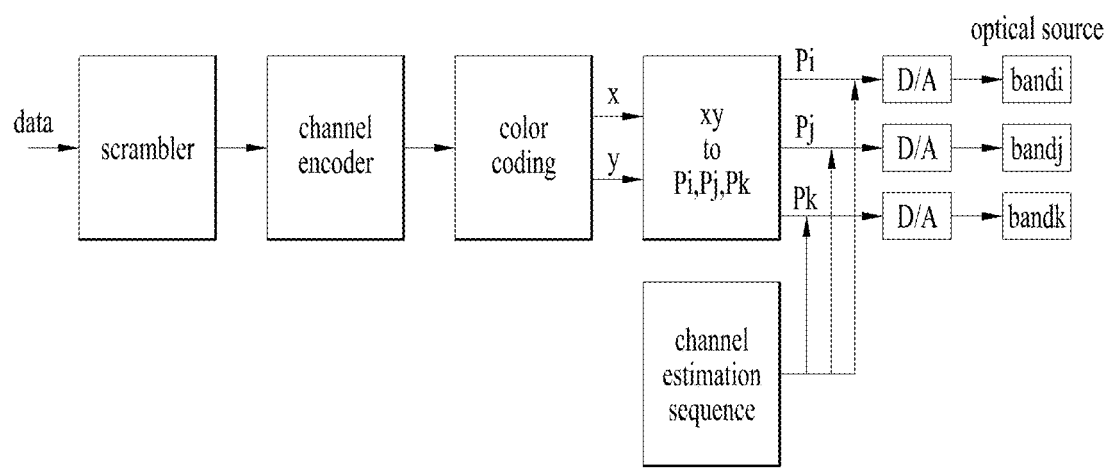
FIG. 9 is a diagram illustrating color-shift keying (CSK) modulation.

The aforementioned SCM and MCM may be operated based on color-shift keying (CSK) modulation. CSK modulation is a method for expressing a digital signal by combining colors based on the color characteristics of a light source. For example, when a digital signal is generated as illustrated in FIG. 9, the digital signal is transformed into a (x, y) color space signal through color coding. The transformed (x, y) color space signal is transmitted by a light source having a color. The color space may be defined as shown in FIG. 10, and the chromaticity distribution table may conform to the CIE 1931 color space (IEEE 802.15.7).

Figure 10:
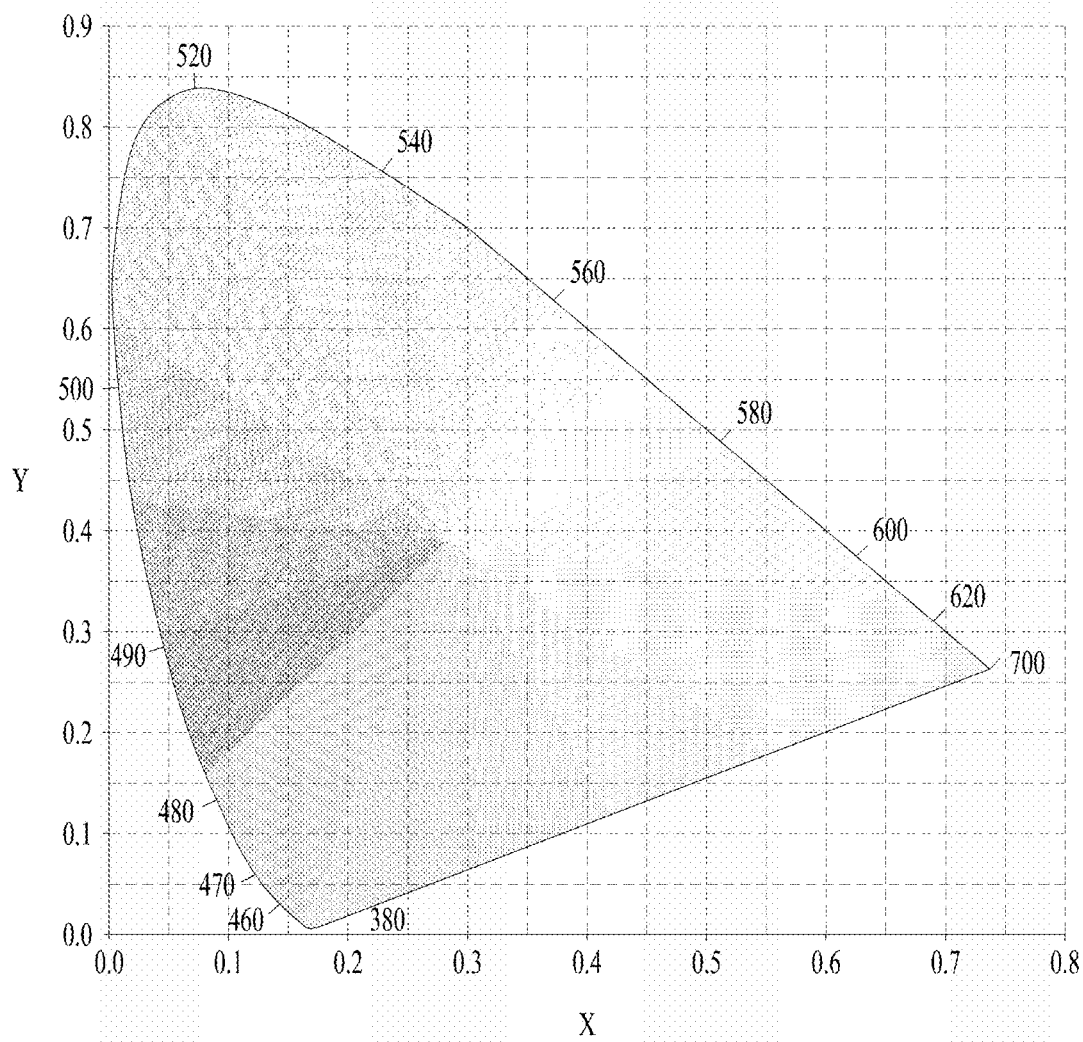
FIGS. 10 to 11 are diagrams illustrating an entire color space according to wavelength and a specific color space that may be expressed according to device characteristics.
Figure 11:
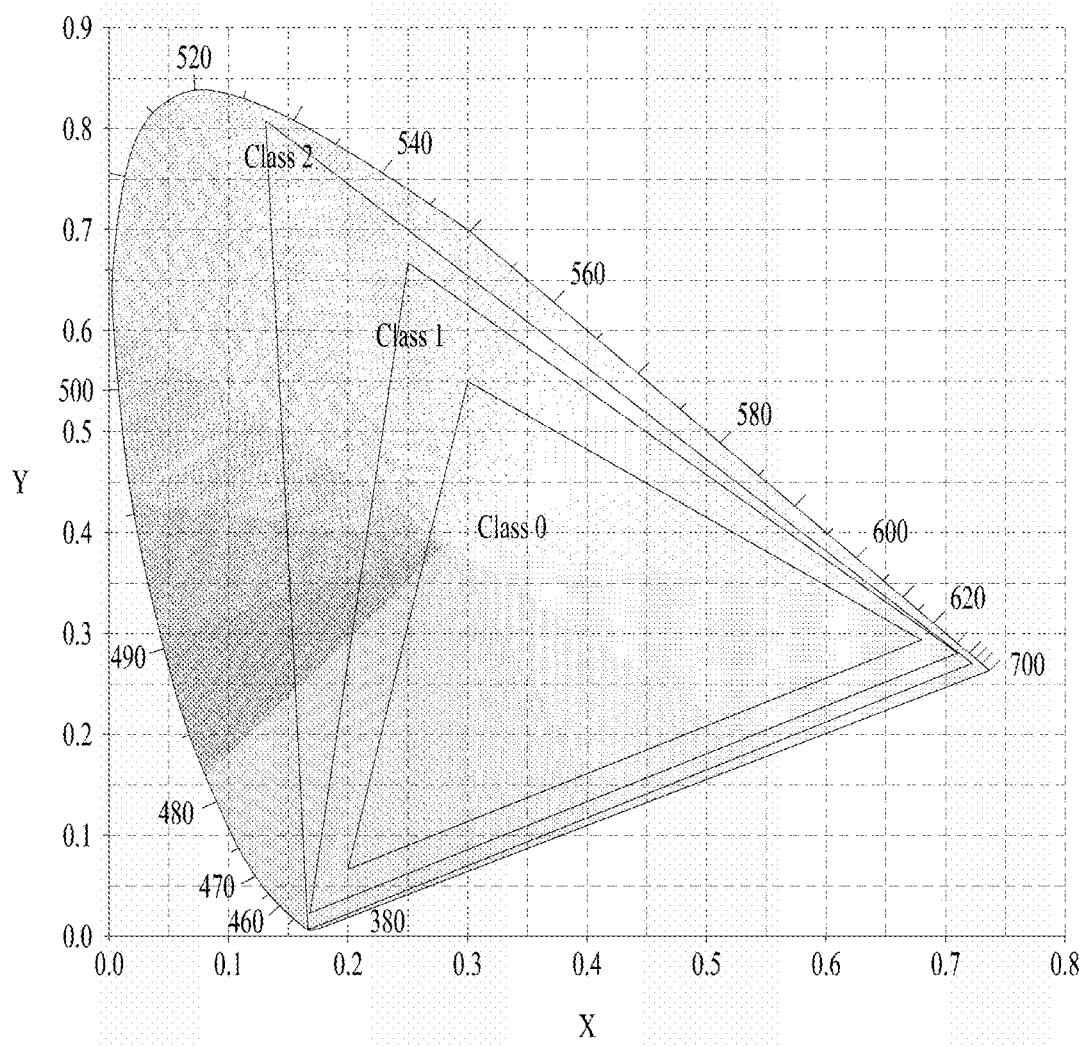

Referring to FIG. 10, the outer curved boundary line corresponds to monochromatic light, and the wavelength of each monochromatic light is indicated in nanometers. The colors shown in FIG. 10 may slightly differ among the color spaces of the color display devices. No conventionally known device may accurately present all the colors shown in FIG. 10. That is, as shown in FIG. 11, the range of colors that may be expressed may differ among the classes of equipment.

When one color is not represented by monochromatic light, it may be generated by mixing a plurality of color light sources (e.g., LEDs). The color point (x, y) is transformed by RGB. Referring to Equation 1, R, G, and B values are transformed into X, Y, and Z values to correspond to (x, y) values in the color space.

$$X = 2.7689R + 1.7517G + 1.1302B \quad \text{[Equation 1]}$$

$$Y = R + 4.5907G + 0.0601B$$

$$Z = 0.0565G + 5.5943B$$

$$x = \frac{X}{X+Y+Z}, \quad y = \frac{Y}{X+Y+Z}$$

Figure 12:
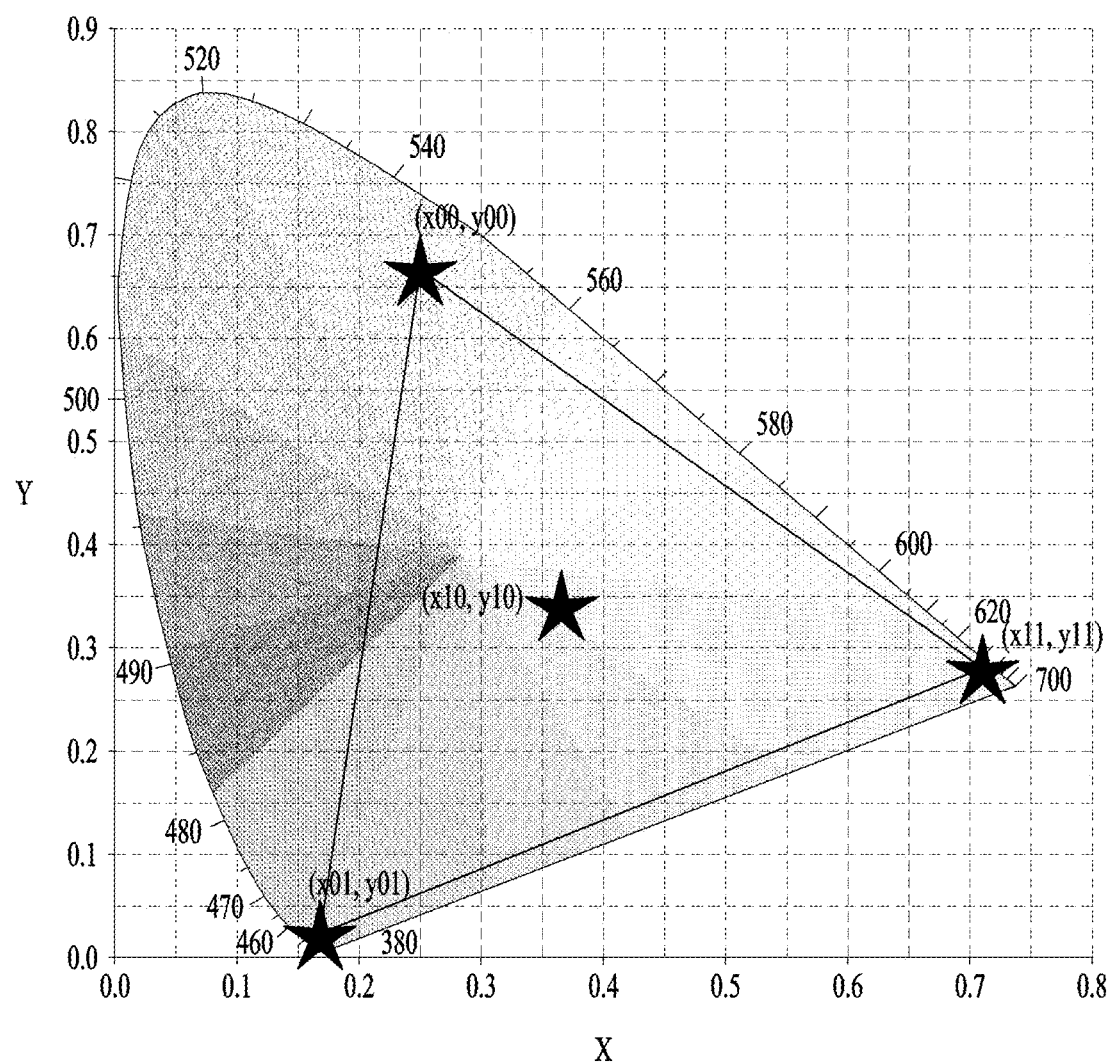
FIG. 12 is a diagram illustrating a method for modulating a binary digital signal in a color space.

Based on the above characteristics, a binary digital signal may be modulated. For example, when it is assumed that the range of colors that may be expressed by a specific device is given as shown in FIG. 12, a binary bit stream corresponding to the star-shaped marks may be defined as shown in Table 2. That is, a signal may be modulated based on the Euclidean distance in the color space.

TABLE 2

| 4 CSK | Set Class 0 |
|---|---|
| 00 | (x00, y00) |
| 01 | (x01, y01) |
| 10 | (x10, y10) |
| 11 | (x11, y11) |

Figure 13:
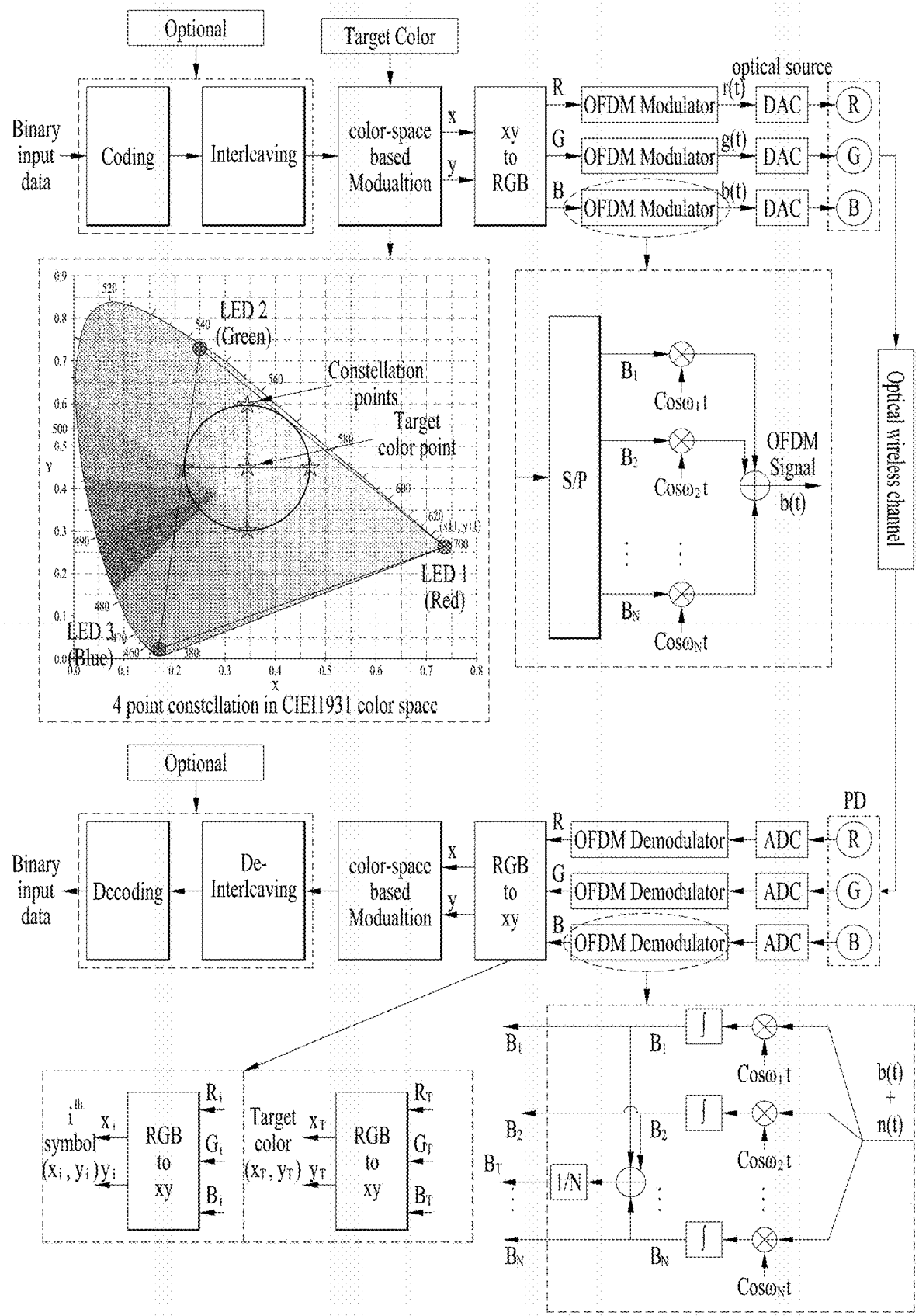
FIG. 13 is a diagram illustrating application of color-shift keying (CSK) modulation to MCM.

The above-described method applied to the MCM may be configured as shown in FIG. 13. That is, as in SCM, the transmitter i) transforms an analog signal generated through an OFDM modulator for R, G, and B values corresponding to (x, y) coordinates in a color space into an optical source through each light source, LED, and ii) transmits the sources on an optical channel. The receiver ii) receives a signal through a photo diode, ii) converts the analog signal to a digital signal through an OFDM demodulator, and iii) matches each signal of R, G, and B to color space (x,y) and decodes the signal by the (x, y) values.

The data transmission method based on the conventional optical wireless communication system described with reference to FIGS. 3 to 13 has a problem in that it is difficult to guarantee the decoding performance of the receiver due to the influence of an external interference light source. In particular, interference from strong sunlight may significantly reduce the decoding performance of the receiver. Accordingly, there is a need for a signal transmission and reception method in an optical wireless communication system that is robust to external interference.

In an example or implementation of the present disclosure, a method of minimizing interference based on the orbital angular momentum of a photon in optical wireless communication is proposed. In an example or implementation of the present disclosure, a transmitter transmits radio light, and a receiver decodes the radio light. An optical wireless communication system according to an example or implementation of the present disclosure may have the structure shown in FIG. 14.

Figure 14:
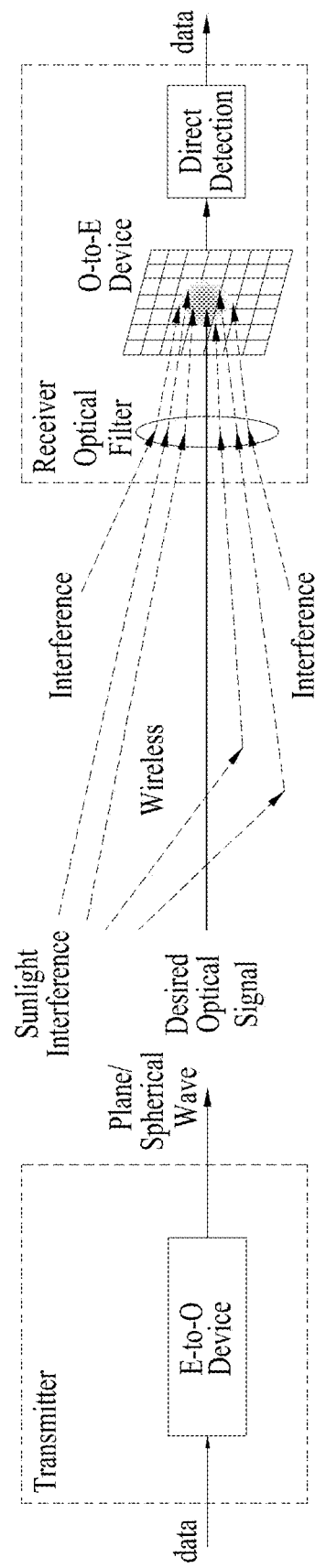
FIGS. 14 to 16 are diagrams illustrating optical wireless communication systems according to examples or implementations of the present disclosure.

Referring to FIG. 14, the transmitter converts data to be transmitted (e.g., electrical signal) into a photon (optical) source by an electrical-to-optical (E-to-O) device and transmits the photon source to the receiver in a wireless environment. The photon source may be referred to as radio light.

Here, the radio light may be interpreted as a wave corresponding to a set of photons and classified into a plane wave and a spherical wave according to the shape of a wavefront. The plane wave refers to a wave with a straight or planar wavefront. For example, the plane wave may be artificially generated by resonance as in a laser beam. The spherical wave refers to a wave in which the wavefront forms a concentric spherical surface around a wave source when the wave source is a point in space. When the spherical wave propagates away, wavefronts are almost parallel to each other, so that the spherical wave may be regarded as the plane wave from the viewpoint of the receiver.

When the receiver receives a desired optical signal including data in a wireless environment, the receiver may receive i) interference from other sources and ii) solar interference from the sun along with the desired optical signal. The receiver may decode the desired optical signal into the data based on i) an optical filter for determining the radio light used for the desired optical signal, ii) an O-to-E device that converts the receiver radio light into an electrical signal, and iii) direct detection for analyzing the signal.

Figure 15:
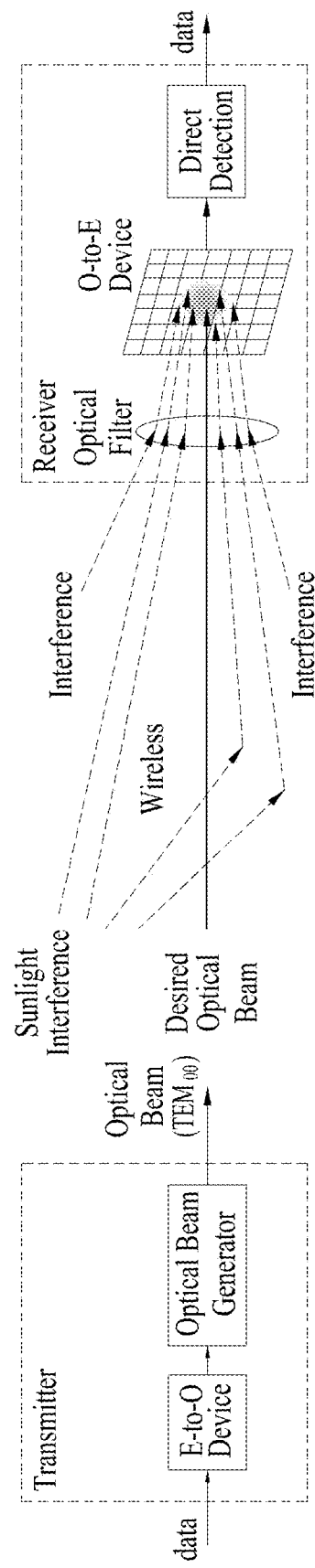

On the other hand, according to an example or implementation of the present disclosure shown in FIG. 15, the transmitter may transmit to the receiver in a wireless environment by i) converting data to be transmitted (e.g., electrical signal) into a photon source with an E-to-O device and ii) generating an optical beam with an optical beam generator.

In optics, radio light may be represented as a beam. In an example or implementation of the present disclosure, a case in which an optical beam is configured based on a transverse electromagnetic field/wave (TEM) mode corresponding to a resonant mode among transverse modes of electromagnetic radiation will be described.

The TEM mode may be divided into $TEM_{lm}$ by indices l and m according to beam formation. In general, the basic form of the TEM mode is a Gaussian beam, which is represented by $TEM_{00}$. $TEM_{00}$ refers to an optical beam in which a wave amplitude distribution on a cross-section perpendicular to an optical axis is expressed by a Gaussian function.

When the receiver receives a desired optical beam including data in a wireless environment, the receiver may receive i) interference from other sources and ii) solar interference from the sun along with the desired optical signal. The receiver may decode the desired optical beam into the data based on i) an optical filter for determining the radio light used for the desired optical beam, ii) an O-to-E device that converts the receiver radio light into an electrical signal, and iii) direct detection for interpreting the signal.

In the above-described two methods, if the receiver uses an optical filter to receive only a band corresponding to the desired optical signal/beam from the entire signal or uses polarized light, the receiver may not fully control interference because sunlight has energy in all bands and includes polarized light in all direction from the perspective of optics.

1. Optical Wireless Communication Transmission and Reception Procedure Based on Photon Orbital Angular Momentum (OAM)

Before describing examples or implementations of the present disclosure, the orbital angular momentum (OAM) characteristic of a photon will be described first.

An electromagnetic wave consists of an electric field and a magnetic field. Angular momentum may be defined by a change in the direction of the electric field. When the direction change of the electric field oscillates perpendicular to the direction of propagation of one electromagnetic wave (or photon), it is called linear polarization. On the other hand, when the direction change of the electric field rotates around the direction of propagation of one electromagnetic wave (or photon), it is called circular polarization.

Light has spin angular momentum (SAM) for each photon, which is expressed by $\pm\hbar$. Wavefronts on which electromagnetic waves (or photons) propagate at the same time is called a phase front, and a plane phase front or plane wave means that all electromagnetic waves have the same phase on wavefronts propagating at the same time.

If an electromagnetic wave is not the plane wave, it is said that the electromagnetic wave has a helical phase front, and in general, it may be referred to as an electromagnetic wave with OAM. Light has OAM for each photon, which is expressed by $m\hbar$. Since the OAM is the definition of a wavefront, electromagnetic waves at each point may be linearly polarized or circularly polarized. The OAM may be called Laguerre-Gaussian modes (e.g., LG beam) or cylindrical transverse mode patterns, TEM(pl) in the optical definition. In an example or implementation of the present disclosure, it is defined for TEM(pl) that p=0 and l is a value corresponding to the OAM mode index. For example, OAM mode 3 is TEM(03). In the present disclosure, only a case of p=0 is assumed for convenience of description, but the present disclosure may be applied in the same way even when p is not zero.

In an example or implementation of the present disclosure, both a radio source and a photon source refer to an electromagnetic wave. However, to distinguish from the conventional communication, the frequency bands of the radio and photon sources according to an example or implementation of the present disclosure are exemplarily limited as follows. The frequency band of the radio source is several terahertz or less, which is defined as a band considered in general wireless communication systems. The frequency band of the photon source is greater than several terahertz, which is defined as a band (e.g., infrared, ultraviolet, visible light, etc.) considered in wireless optical systems. In a special purpose environment, the methods proposed in the present disclosure may be equally applied to x-rays and gamma rays.

In an example or implementation of the present disclosure, a transmission and reception method in an optical wireless communication system based on photon OAM is proposed. Specifically, initial access based on legacy links and initial access based on broadcast messages will be described.

1.1. Initial Access Based on Legacy Link

A transmitting UE and receiving UE may share initial information for optical wireless communication through legacy links (e.g., LTE, LTE-A, NR, WiFi, Bluetooth, etc.). The initial information for optical wireless communication may include the following.

i) Band for transmission and reception: This may mean a frequency band or light wavelength range for transmission and reception of data and control information.

ii) Polarization for transmission and reception: This may mean a polarization direction for transmission and reception of data and control information. For example, it may be agreed between the transmitting UE and receiving UE that data and control information is exchanged based on only vertical polarization for interference control.

iii) OAM mode for transmission and reception: This may mean an OAM mode index for transmission and reception of data and control information.

iv) Baseband modulation for transmission and reception: This may mean a baseband modulation method for transmission and reception of data and control information. For example, for data modulation and demodulation, i) an on/off keying (OOK) method may be used for single carrier modulation, or ii) an orthogonal frequency-division multiplexing (OFDM) method may be used as for multi-carrier modulation, which may be agreed between the transmitting UE and receiving UE.

1.2. Initial Access Based on Broadcast Message

A transmitting UE and receiving UE may share initial information based on broadcast messages. For example, the transmitting UE and receiving UE may broadcast a predetermined broadcast message on an optical or radio resource as in broadcast over a physical broadcast channel (PBCH) or common control channel of LTE/LTE-A in order to share the initial information for optical wireless communication. The initial information for optical wireless communication may be as follows.

i) Band for transmission and reception: This may mean a frequency band or light wavelength range for transmission and reception of data and control information.

ii) Polarization for transmission and reception: This may mean a polarization direction for transmission and reception of data and control information. For example, it may be agreed between the transmitting UE and receiving UE that data and control information is exchanged based on only vertical polarization for interference control.

iii) OAM mode for transmission and reception: This may mean an OAM mode index for transmission and reception of data and control information.

iv) Baseband modulation for transmission and reception: This may mean a baseband modulation method for transmission and reception of data and control information. For example, for data modulation and demodulation, i) an OOK method may be used for single carrier modulation, or ii) an OFDM method may be used as for multi-carrier modulation, which may be agreed between the transmitting UE and receiving UE.

Figure 16:
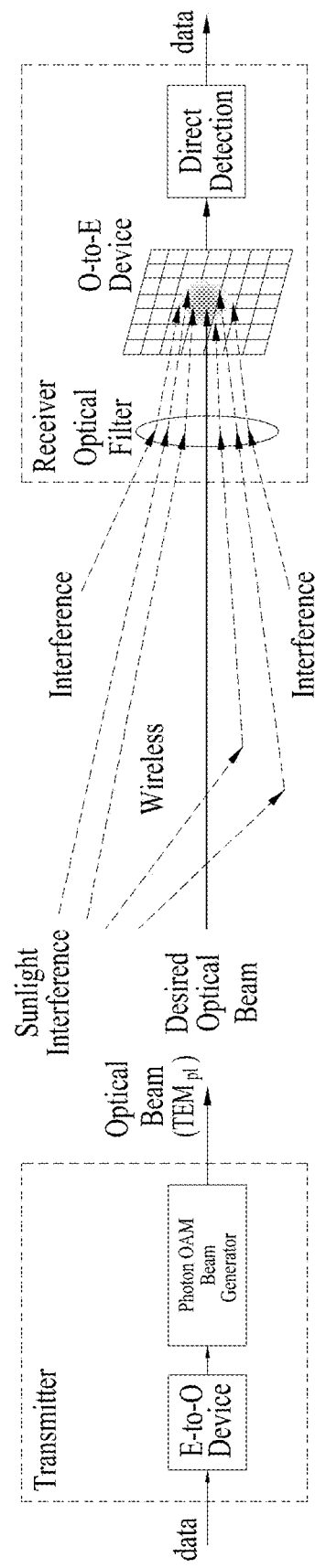

2. Optical Wireless Communication Transmitter and Receiver Based on Photon OAM 2.1. Transmitting UE and Receiving UE in OAM-based Optical Wireless Communication In an example or implementation of the present disclosure shown in FIG. 16, proposed is a system including: i) a transmitting UE transmitting a signal based on a photon OAM beam generator; and ii) a receiving UE using an optical filter for distinguishing a desired OAM beam from optical interference. According to the proposed system, it is possible to minimize interference from sunlight or other sources having the same band and same polarization as those of a desired optical beam.

If radio light is interpreted as an electromagnetic wave, the TEM mode may be classified depending on to the shape of a beam. The basic form of the TEM mode is generally a Gaussian beam, which is represented by $TEM_{00}$. Hermite-Gaussian (HG) modes with rectangular transverse mode patterns are represented by $TEM_{mn}$. LG modes with cylindrical transverse mode patterns are represented by $TEM_{pl}$. In an example or implementation of the present disclosure, the LG modes ($TEM_{pl}$) may be represented by photon OAM.

2.2. Transmitting UE

A transmitting UE may convert an electric source including data to be transmitted into an optical source with an E-to-O device. The converted optical source may be converted into a photon OAM beam by a photon OAM beam generator as follows.

i) The transmitting UE may convert the optical source into a Gaussian beam ($TEM_{00}$) by passing the optical source through a resonator and then convert the Gaussian beam into the photon OAM beam ($TEM_{pl}$) with a spiral phase plate.

ii) The transmitting UE may convert the optical source to a Gaussian beam ($TEM_{00}$) by passing the optical source through a resonator, and convert the Gaussian beam into the photon OAM beam ($TEM_{pl}$) by reflecting the Gaussian beam on a phase hologram with a spiral phase pattern.

iii) The transmitting UE may convert the optical source to a Gaussian beam ($TEM_{00}$) by passing the optical source through a resonator and convert the Gaussian beam into the photon OAM beam ($TEM_{pl}$) by reflecting the Gaussian beam on a phase hologram with a fork diffraction pattern.

iv) The transmitting UE may convert the optical source to a Hermite-Gaussian beam ($TEM_{mn}$) by passing the optical source through a resonator and convert the Hermite-Gaussian beam into the photon OAM beam ($TEM_{pl}$) by passing the Hermite-Gaussian beam through a cylindrical lens HG-LG mode converter (e.g., pi/2 mode converter).

In addition to methods i) to iv) described above, various methods capable of generating a photon OAM beam may be applied to examples or implementations of the present disclosure.

2.3. Receiving UE 2.3.1. Optical Filter

An optical filter provided in a receiving UE may include a general optical filter or a polarizing filter. The general optical filter is an optical element for receiving a band corresponding to a desired optical beam. The optical filter may include a filter that transmits with a constant transmittance regardless of wavelengths, a correction filter that controls light intensity in a specific wavelength range, and a light contrast filter. The optical filter may be classified into an infrared range filter, a visible range filter, an ultraviolet range filter, a vacuum ultraviolet range filter, and so on depending on frequency ranges. Filters in each range may have different materials and structures.

Alternatively, the optical filter may be a polarized light filter (polarization filter). The polarization filter is a filter based on polarization, i.e., a filter for passing only light vibrating in a specific direction in order to receive polarized light corresponding to a desired optical beam. In general, polarization mainly occurs when obliquely projection light is reflected from a uniform surface. Therefore, if the polarization filter is used to block light reflected from the surface of a glass window or object, a clear and sharp image may be obtained. For example, a camera has a polarization filter capable of adjusting and rotating a polarization direction. If an autofocus camera uses the polarization filter, the autofocus camera may not recognize light and thus lose a focus because only wavelengths vibrating in one direction remain. A solution to this phenomenon is a circular polarization filter.

2.3.2. Lens

A lens is a device for focusing a received optical source to a focal point based on the effect of refraction.

2.3.2.1. Focal Point Control Based on Wavelength

Figure 17:
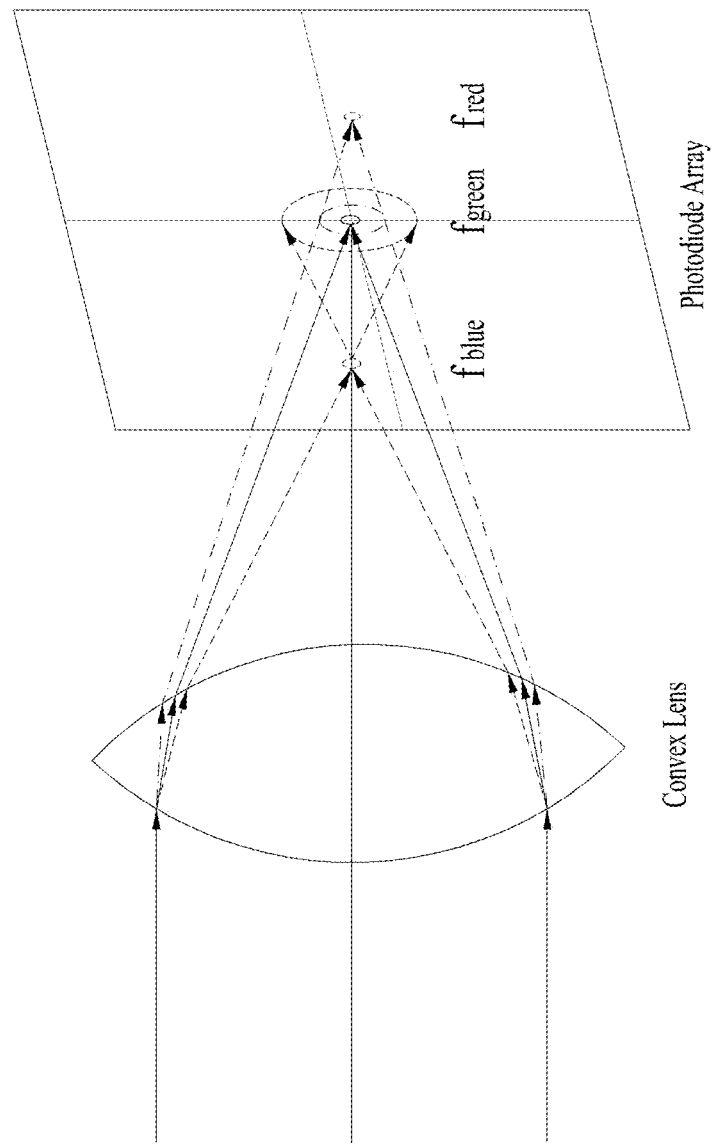
FIGS. 17 to 21 are diagrams for explaining optical filters applicable to an optical wireless communication systems according to an example or implementation of the present disclosure and acquisition of a desired beam using the same.

Referring to FIG. 17, an optical source passing through a convex lens or a Fresnel lens has different focal points depending on wavelengths. Based on this characteristic, the receiving UE may control the intensity concentration of the optical source received on a photodiode array. The photodiode array according to an example or implementation of the present disclosure refers to an array in which a plurality of light receiving elements performing O-to-E conversion are distributed in a specific area.

For example, when the focal point of green light is denoted by $f_{green}$ in FIG. 17, the focal points of blue light and red light are $f_{blue}$ and $f_{red}$, respectively. It may be seen that the blue light, green light, and red light have different focal points. Based on this characteristic, the receiving UE may control the intensity of green light to be concentrated at the center of the photodiode array, the intensity of red light to spread over a larger area, and the intensity of blue light to spread over a further larger area.

Based on the above control, the receiving UE may receive a green light signal at the focal point of the green light more efficiently. The receiving UE may control focal points depending on wavelengths by i) controlling the thickness of the convex lens or Fresnel lens or ii) controlling the distance between the convex lens and the photodiode array.

2.3.2.2. Focal Point Control Based on OAM Mode

Figure 18:
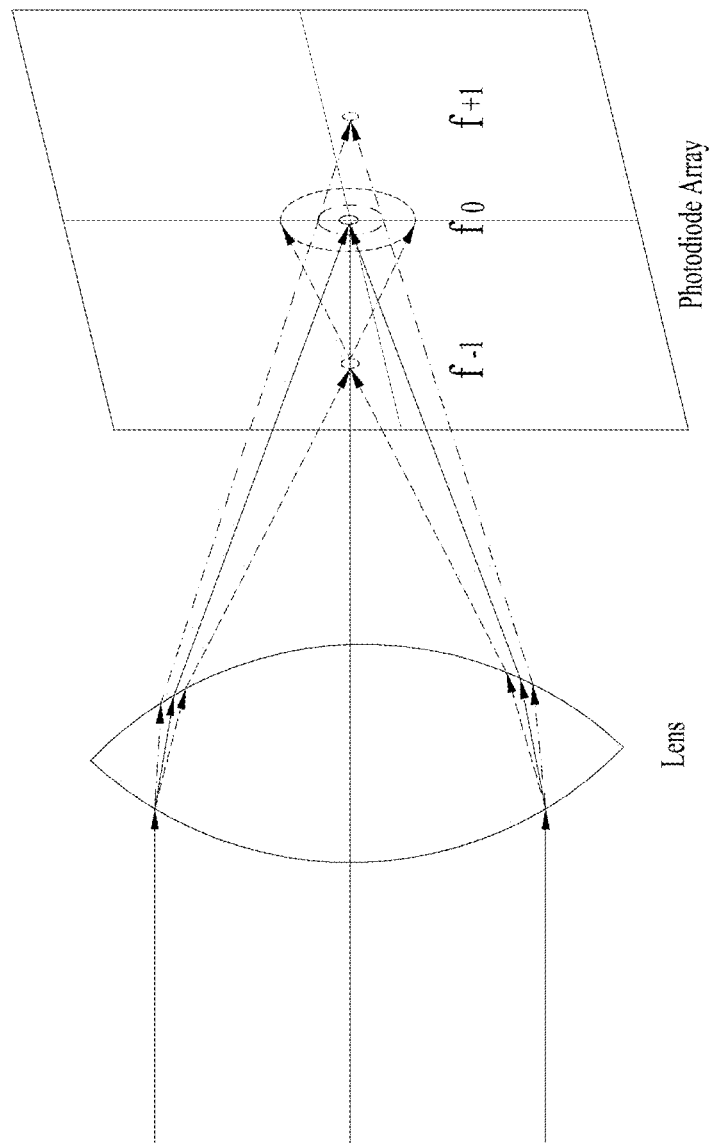

Referring to FIG. 18, an OAM optical source passing through a lens with an arbitrary refraction angle (e.g., Fresnel lens) has different focal points depending on mode indexes. Based on this characteristic, the receiving UE may control the intensity concentration of OAM modes received on the photodiode array.

For example, it may be seen from FIG. 18 that OAM mode +1, OAM mode 0, and OAM mode −1 have different focal points. In OAM mode 0, the receiving UE may control the intensity to be concentrated at the center of the photodiode array. In OAM mode −1, the receiving UE may control the intensity to spread over a larger area. In OAM mode +1, the receiving UE may control the intensity to spread over a further larger area.

When the focal point of OAM mode 0 is $f_0$, the focal point of mode index m, $f_m$ may be approximated as follows: $f_m = f_0(1+C \cdot m)$, where constant C is an OAM dispersion coefficient.

The receiving UE may control the focal points of OAM modes by i) controlling the thickness of the lens or Fresnel lens or ii) controlling the distance between an arbitrary lens and the photodiode array.

2.3.3. Fresnel Zone Plate

A Fresnel zone plate is a device for focusing a received optical source to a focal point based on the effect of diffraction. Specifically, the zone plate or Fresnel zone plate is a device for focusing materials with light or wave characteristics. Unlike lenses or curved mirrors, the zone plate may use diffraction instead of reflection and refraction. The zone plate consists of a set of radially symmetric rings that alternate between opaque and transparent areas, which is known as a Fresnel zone. Light hitting the zone plate is diffracted around an opaque area. The areas may be spaced apart so that diffracted light structurally interferes at a desired focal point to produce an image.

Figure 19:
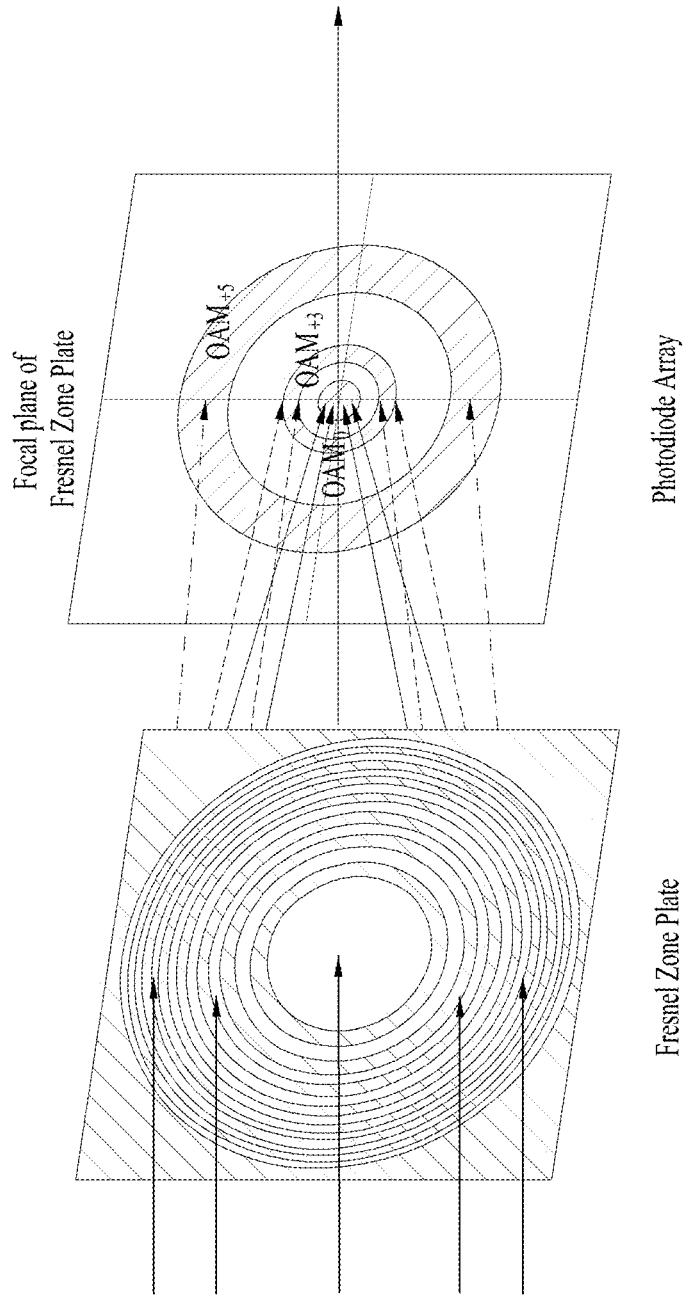

It may be seen from FIG. 19 that an optical source passing through the Fresnel zone plate have different wave characteristics or have different intensity distributions in a focal plane depending on OAM mode indexes. Based on these characteristics, the receiving UE may control the intensity distribution of the optical source received on the photodiode.

Referring to FIG. 19, when the optical source passing through the Fresnel zone plate is i) natural light such as sunlight or ii) plane wave light such as linearly polarized light or circularly polarized light, the intensity thereof may be concentrated at the center of the focal plane of the Fresnel zone plate.

When the optical source passing through the Fresnel zone plate is a plane wave light beam and a Gaussian beam, the intensity of the optical source may be distributed with a Gaussian distribution with respect to the center of the photodiode, which is located at the focal plane of the Fresnel zone plate.

When the optical source passing through the Fresnel zone plate is an LG beam corresponding to helical wave light, the intensity may be distributed in the form of a ring with respect to the center of the photodiode located at the focal plane of the Fresnel zone plate while maintaining the characteristics of an OAM state.

For example, in FIG. 19, OAM mode 0, OAM mode +3, and OAM mode +5 have different intensity distributions. In OAM mode 0, the receiving UE may control the intensity to be concentrated at the center of the photodiode with the Gaussian distribution. In OAM mode +3, the receiving UE may control the intensity to spread over a larger area in the form of a ring. In OAM mode +5, the receiving UE may control the intensity to spread over a further larger area in the form of a ring. In this case, for general plane wave light such as i) natural light such as sunlight and ii) linearly polarized or circularly polarized light, the intensity thereof may be concentrated in a very small area at the center of the photodiode. This area is smaller than the area in OAM mode 0 where the intensity is distributed at the center of the photodiode with the Gaussian distribution.

The receiving UE may control the intensity distribution of the optical source received on the photodiode by i) controlling a pattern according to the ring configuration of the Fresnel zone plate or ii) controlling the distance between the Fresnel zone plate and the photodiode.

2.3.4. Photon Sieve

A photon sieve is a device for focusing a received optical source to a focal point based on diffraction and interference effects. The photon sieve may include a flat sheet filled with pinholes arranged in a pattern similar to the ring of the Fresnel zone plate described above. The photon sieve may provide a much sharper focal point than the zone plate. The photon sieve is manufactured to include pinholes with various sizes and patterns and the characteristics of the focal point operation may vary depending on applications, so that the photon sieve may be used in various ways.

The receiving UE may control the intensity distribution of the optical source received on the photodiode based on i) wave characteristics of the optical source passing through the photon sieve or ii) the characteristic that the intensity distribution at the focal plane varies according to the OAM mode index.

When the optical source passing through the photon sieve is i) natural light such as sunlight or ii) plane wave light such as linearly or circularly polarized light, the intensity of the optical source may be concentrated at the center of the photodiode array located at the focal plane of the photon sieve.

When the optical source passing through the photon sieve is a plane wave light beam and a Gaussian beam, the intensity of the optical source is distributed with a Gaussian distribution with respect to the center of the photodiode array located at the focal plane of the photon sieve.

When the optical source passing through the photon sieve is an LG beam corresponding to helical wave light, the intensity may be distributed in the form of a ring with respect to the center of the photodiode array located at the focal plane of the photon sieve while maintaining the characteristics of an OAM state.

Figure 20:
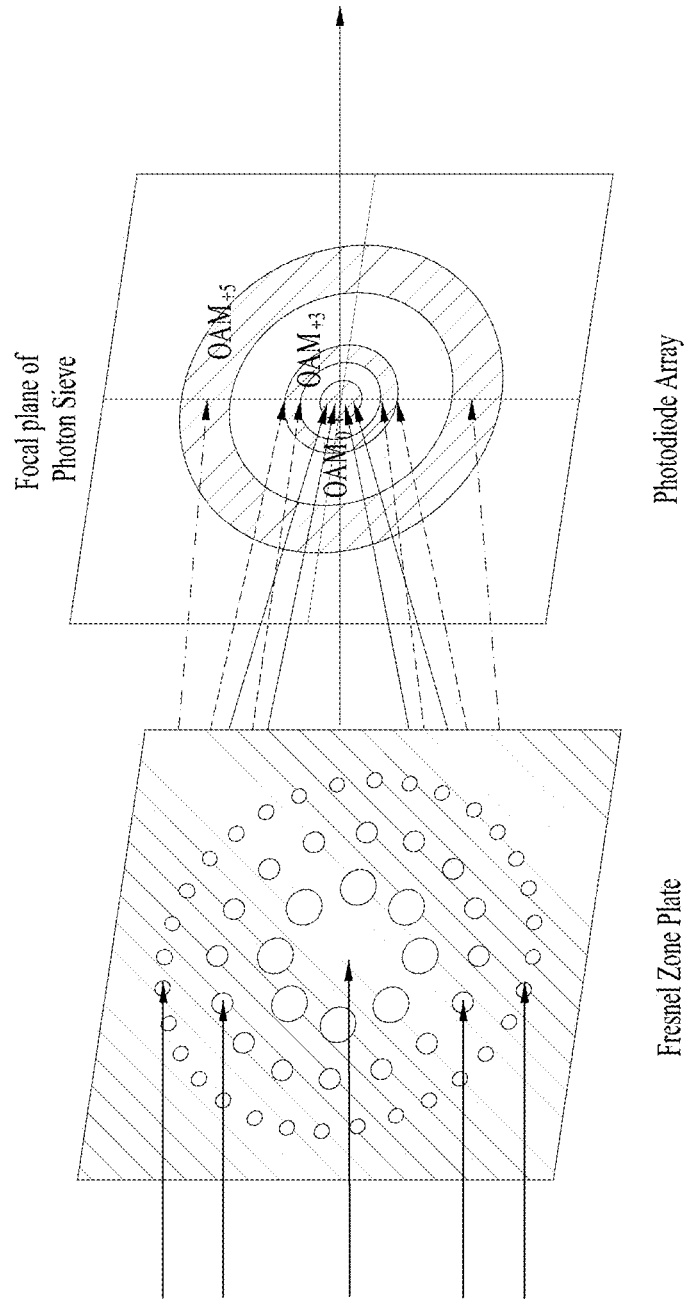

For example, in FIG. 20, OAM mode 0, OAM mode +3, and OAM mode +5 have different intensity distributions. In OAM mode 0, the receiving UE may control the intensity to be concentrated at the center of the photodiode with the Gaussian distribution. In OAM mode +3, the receiving UE may control the intensity to spread over a larger area in the form of a ring. In OAM mode +5, the receiving UE may control the intensity to spread over a further larger area in the form of a ring. In this case, for general plane wave light such as i) natural light such as sunlight, and ii) linearly polarized or circularly polarized light, the intensity thereof may be concentrated in a very small area at the center of the photodiode. This area is smaller than the area in OAM mode 0 where the intensity is distributed at the center of the photodiode with the Gaussian distribution.

The receiving UE may control the intensity distribution of the optical source received on the photodiode array by i) controlling a pattern according to the pinhole configuration of the photon sieve or ii) controlling the distance between the photon sieve and the photodiode array.

2.3.5. Phase Mask

A phase mask is a device for controlling a propagation direction according to the characteristics of a received optical source based on the effect of diffraction. The phase mask may include optical elements.

The receiving UE may control the position of the intensity distribution of the optical source received on the photodiode array based on i) the wave characteristics of the optical source passing through the phase mask (or pattern mask) or ii) the characteristic that the propagation direction of a beam changes depending on the OAM mode index.

Figure 21:
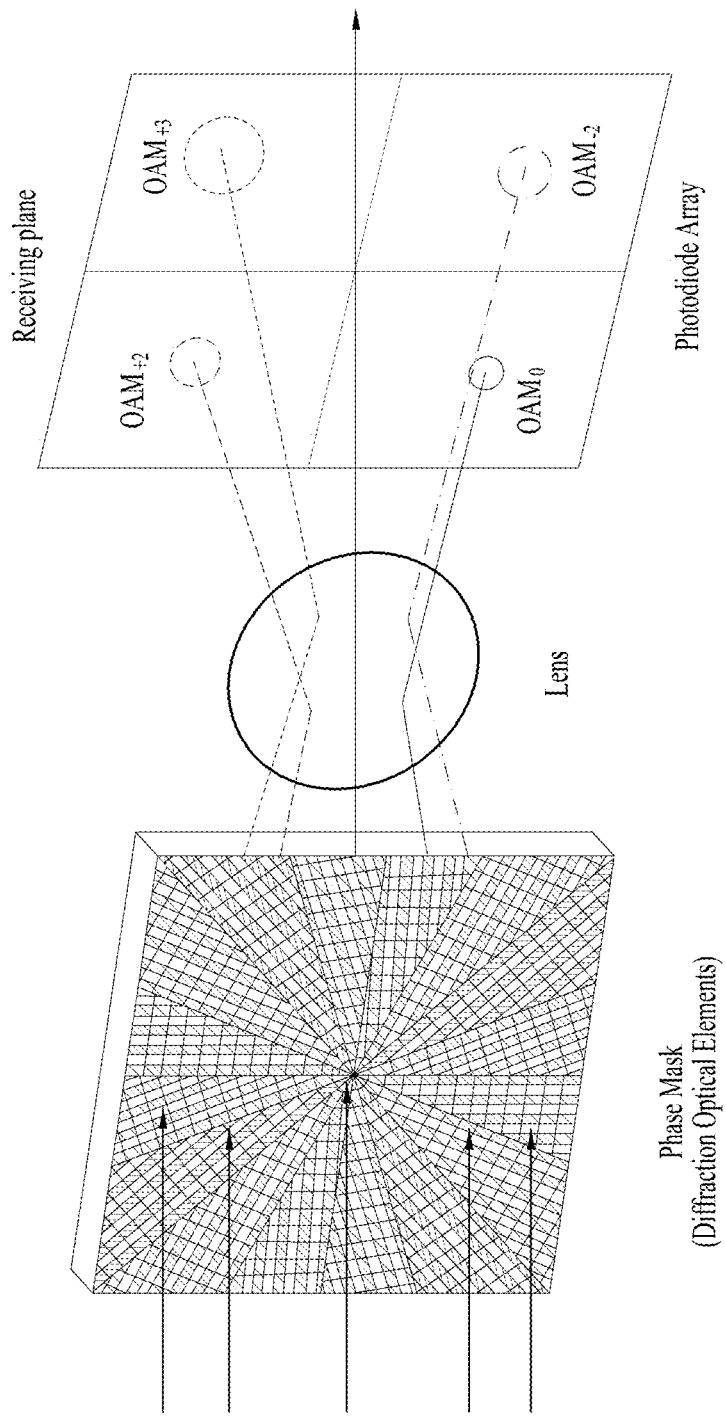

For example, it may be seen from FIG. 21 that OAM mode 0, OAM mode +2, OAM mode −2, and OAM mode +3 have different intensity distribution positions. In this case, since general plane wave light such as i) natural light such as sunlight and ii) linearly or circularly polarized light has the same phase characteristics as a plane wave of OAM mode 0, the intensity thereof may be distributed in the third quadrant of a receiving plane in which the intensity distribution of OAM mode 0 is located. On the other hand, a lens serves to focus the optical source passing through the phase mask on the receiving plane.

The receiving UE may control the position of the intensity distribution of the optical source received on the photodiode array by i) controlling the phase elements constituting the phase mask or ii) controlling the distance between the phase mask and the photodiode array, the distance between the phase mask and the lens, and/or the distance between the lens and the photodiode array.

According to an example or implementation of the present disclosure, two or more of the above-described optical filters (e.g., lens, Fresnel zone plate, photon sieve, and phase mask) may be combined and applied to obtain each characteristic multiply. For example, the receiving UE may i) receive a specific wavelength with the general optical filter to control its received wavelength, ii) receive desired polarized light with the polarization filter, and iii) distinguish plane wave and spiral wave modes based on the characteristics of wave light with the photon sieve.

3. Beam Divergence Depending on Characteristics of Optical/Photon Source

In general, radio light has beam divergence depending on the characteristics of an optical/photon source. In an example or implementation of the present disclosure, a method of selecting an OAM mode between a transmitting UE and receiving UE based on the beam divergence of radio light is proposed.

3.1. Divergence Angle of Gaussian Beam

Figure 22:
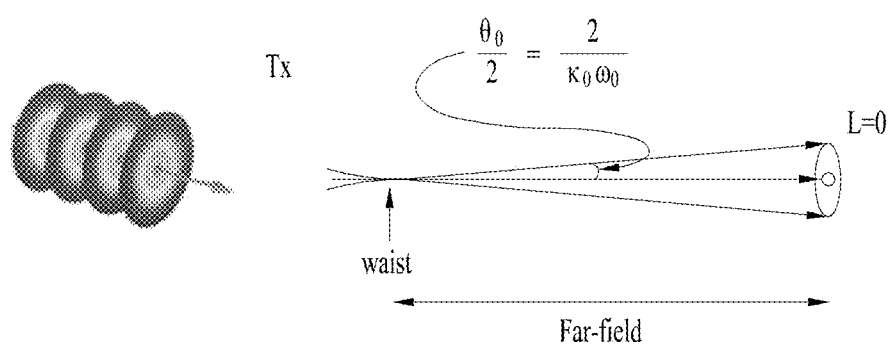
FIGS. 22 to 24 are diagrams for explaining beam distributions depending on the characteristics of optical resources used in an optical wireless communication systems according to an example or implementation of the present disclosure.

FIG. 22 is a diagram for explaining the dispersion angle of a Gaussian beam in a far field. The dispersion angle of the Gaussian beam may be defined as shown in [Equation 2] below. In Equation 2, $k_o$ is a wave vector with a value of $2\pi/\lambda$, and $w_o$ is a minimum beam waist, which may vary depending on beam formation.

$$\frac{\theta_o}{2} = \frac{2}{k_o w_o} = \frac{\lambda}{\pi w} \quad \text{[Equation 2]}$$

It is assumed that M2 is set to 1 (M2=1) when the transmitting UE forms a beam by optimally designing an M2 factor. Referring to FIG. 22, i) when waist=658 um and wavelength=700 nm, angle=338.6 urad (i.e., 0.0194 degrees). In addition, ii) when waist=375 um and wavelength=400 nm, angle=338.6 urad (i.e., 0.0194 degree). In this case, the radius of the beam is 3.4 mm at a distance of 10 m (distance=10 m).

3.2. Divergence Angle of LG Beam

Figure 23:
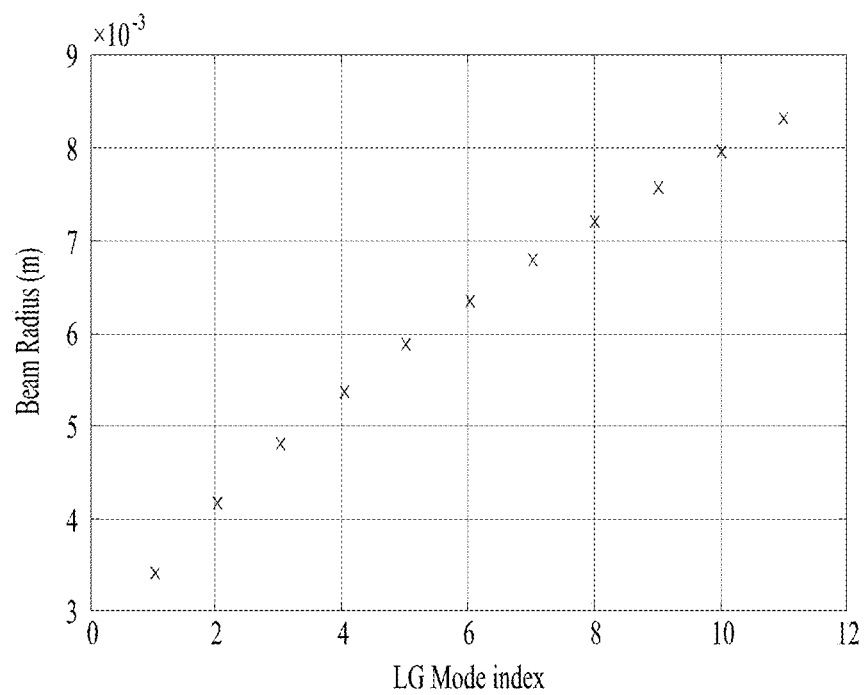
Figure 24:
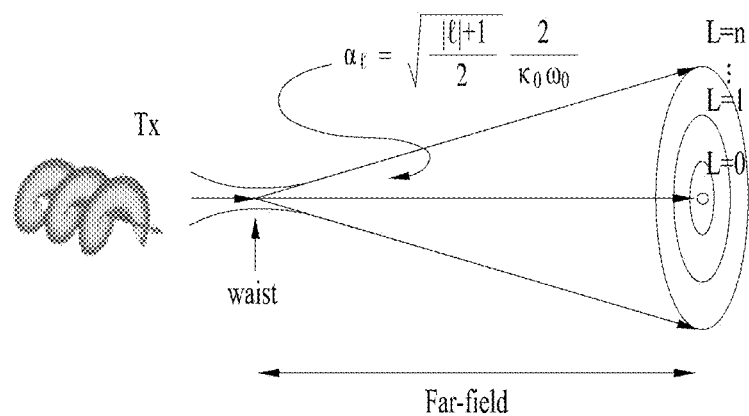

FIGS. 23 and 24 are diagrams for explaining the divergence angle of an LG beam in a far field. The divergence angle of the LG beam is defined based on [Equation 3] to [Equation 5] below. Specifically, [Equation 3] shows a case where $w_o$ is fixed, and [Equation 4] shows a case where $r_{rms}(0)$ is fixed. Here, $k_o$ is a wave vector with a value of $2\pi/\lambda$, and $w_o$ is a minimum beam waist, which may vary depending on beam formation. The relationship between $k_o$ and $w_o$ may be defined as shown in [Equation 5]

$$\alpha_\ell = \sqrt{\frac{|\ell|+1}{2}} \frac{2}{k_0 w_0} \quad \text{[Equation 3]}$$

$$\alpha_\ell = \frac{|\ell|+1}{k_0 r_{rms}(0)} \quad \text{[Equation 4]}$$

$$r_{rms}(0) = \sqrt{\frac{|\ell|+1}{2}} w_0 \quad \text{[Equation 5]}$$

It is assumed that M2 is set to 1 (M2=1) when the transmitting UE forms a beam by optimally designing an M2 factor. Referring to FIG. 23, the radius of the beam may appear as shown in FIG. 23 at a distance of 10 m (distance=10 m) according to |l|. Referring to FIG. 24, in the case of an OAM beam, the beam radius may vary depending on OAM order l. Also, the beam size (e.g., beam radius) at the receiving UE may vary depending on the distance between the transmitting UE and receiving UE. Considering that the receiving UE needs to receive all optical/photon sources of the beam transmitted from the transmitting UE to improve reception efficiency, a method of appropriately controlling the divergence angle of the beam based on the above-described characteristics of the beam is required.

Figure 25:
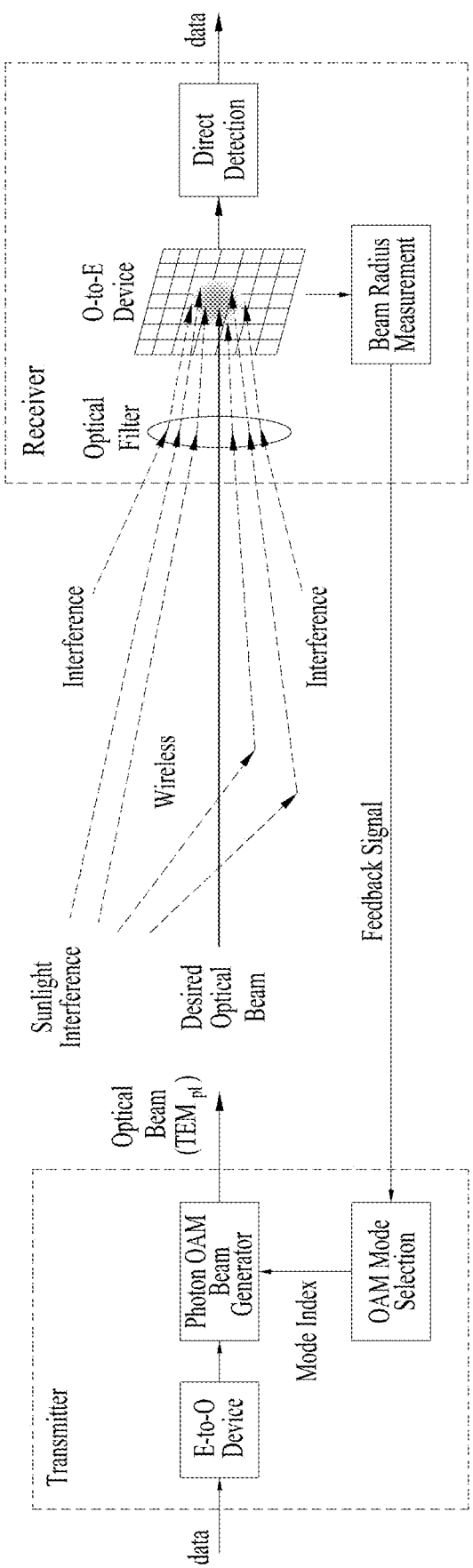
FIGS. 25 to 35 are diagrams for explaining a feedback based orbital angular momentum (OAM) mode selection method in an optical wireless communication systems according to an example or implementation of the present disclosure.

4. OAM Mode Selection Based on Sensing 4.1. A transmitting UE may transmit data on a desired optical beam, for example, $TEM_{pl}$ according to the method defined in Clause "1. Optical Wireless Communication Transmission and Reception Procedure Based on Photon OAM" described above. FIG. 25 is a diagram illustrating a transmitting UE and a receiving UE according to an example or implementation of the present disclosure. The transmitting UE may transmit a periodic (or aperiodic) reference signal in a manner agreed upon with the receiving UE when transmitting a desired beam.

4.2. Referring to FIG. 25, the receiving UE may receive the desired optical beam (e.g., $TEM_{pl}$) with an optical filter and an O-to-E Device according to the method defined in Clause "2. Optical Wireless Communication Transmitter and Receiver Based on Photon OAM" described above.

Figure 26:
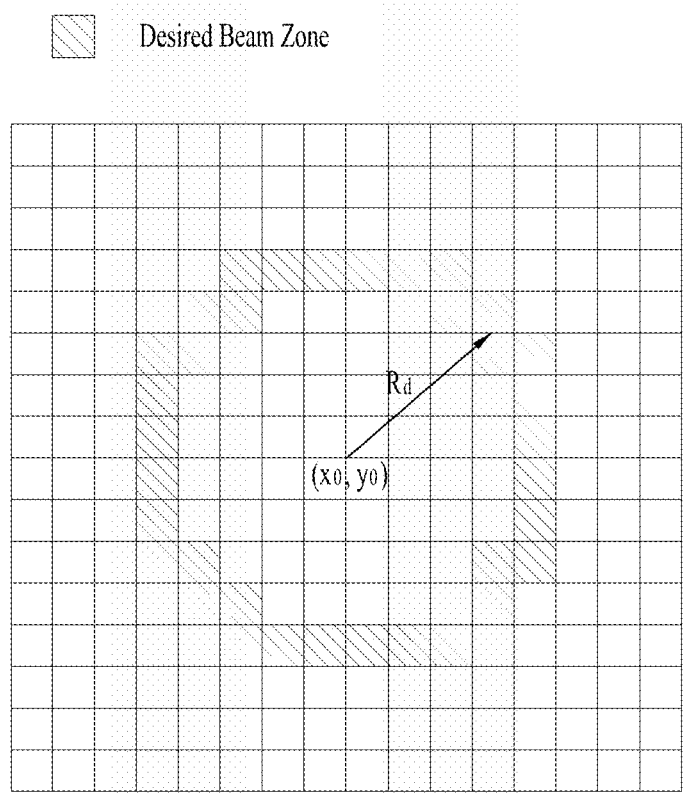

4.3. Referring to FIG. 26, the receiving UE may measure a photodiode array area for the desired beam based on the reference signal and measure the radius of the beam. In this case, the receiving UE may determine photodiodes within a threshold as desired photodiodes based on the average intensity of photodiodes related to the desired beam. This may be defined as shown in [Equation 6] below.

$$\frac{\left(\sum_{p}^{|D|} Intensity_p\right)}{|D|} - threshold_I < desired\ photodiode < \frac{\left(\sum_{p}^{|D|} Intensity_p\right)}{|D|} + threshold_I.$$

[Equation 6]

Figure 27:
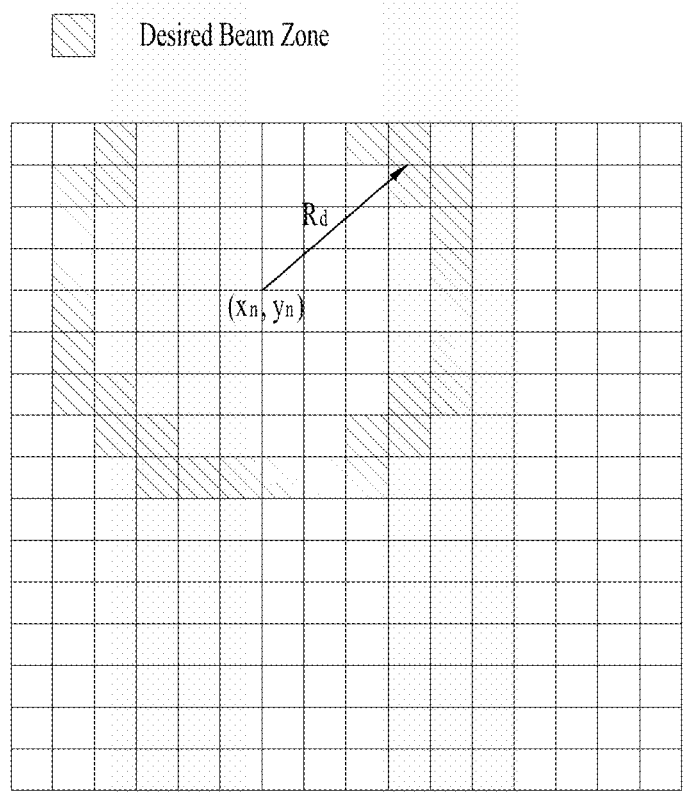

In [Equation 6], D denotes a set of photodiodes related to a desired beam zone, |D| denotes the number of photodiodes related to the desired beam zone, and $threshold_I$ denotes a predetermined or adaptively configured intensity threshold. The receiving UE may measure the beam radius ($R_d$) from the determined desired photodiodes. As shown in FIG. 27, the desired photodiodes may be distributed around a point other than the center ($x_0$, $y_0$) of the photodiode array, for example, ($x_n$, $y_n$). In this case, the receiving UE may infer $R_d$ based on the measured pattern.

Figure 28:
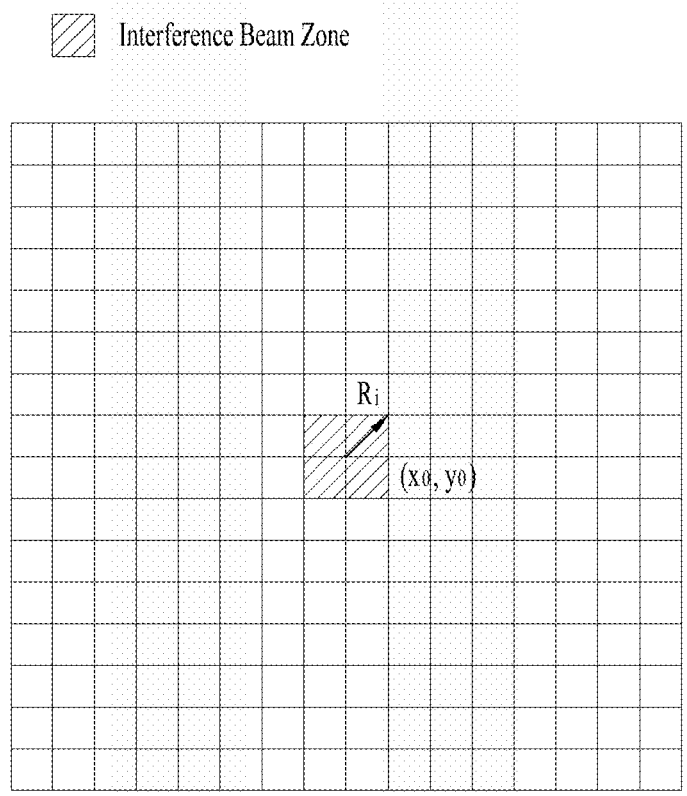
Figure 29:
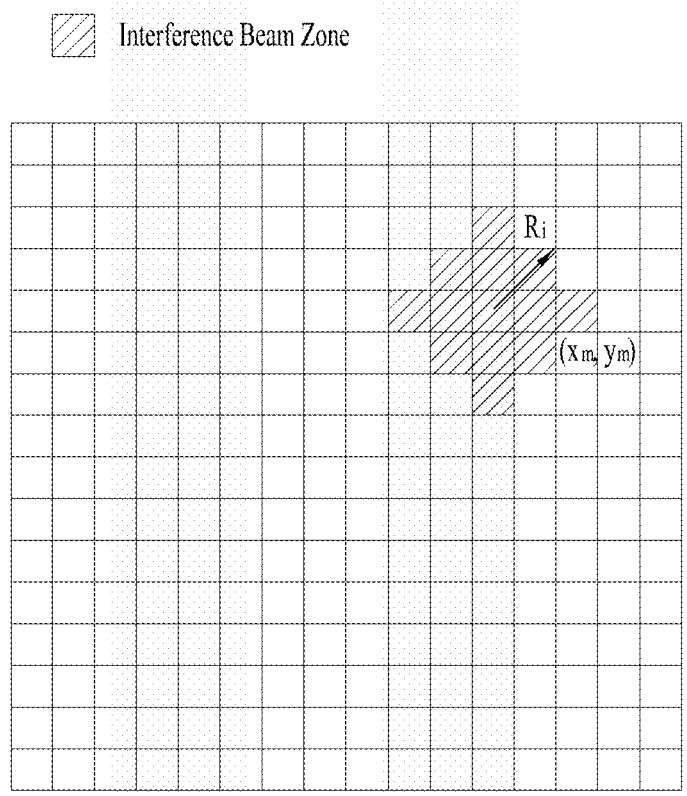

4.4. Referring to FIG. 28, the receiving UE may measure a photodiode array area for an interference beam based on the measured intensity and measure the radius of the beam. For example, the receiving UE may determine photodiodes with intensity greater than a predetermined threshold as interference photodiodes. The receiving UE may measure the beam radius ($R_i$) from the determined interference photodiodes. As shown in FIG. 29, the interference photodiodes may be distributed around a point other than the center ($x_0$, $y_0$) of the photodiode array, for example, ($x_m$, $y_m$). In this case, the receiving UE may infer $R_i$ based on the measured pattern.

It is not essential for the receiving UE to measure the photodiode array area and beam radius based on the measured intensity in an example or example of the present disclosure. That is, the measurement may be selectively performed.

4.5. The receiving UE may feed back information on the measured beam radius to the transmitting UE. For example, the receiving UE may feed back information on the beam radius to the transmitting UE over a feedback channel (e.g., PUCCH or PUSCH of LTE/LTE-A/NR).

The feedback information may be at least one of i) the beam radius $R_d$ and reference coordinates ($x_n$, $y_n$) of the desired beam, and ii) the beam radius $R_i$ and reference coordinates ($x_m$, $y_m$) of the interference beam. The feedback information may be i) transmitted in the form of data by the receiving UE, ii) transmitted as quantized information, or iii) transmitted as an index based on a predefined lookup table. Meanwhile, the receiving UE may estimate a required OAM mode index and transmit the OAM mode index to the transmitting UE in the feedback information.

Figure 30:
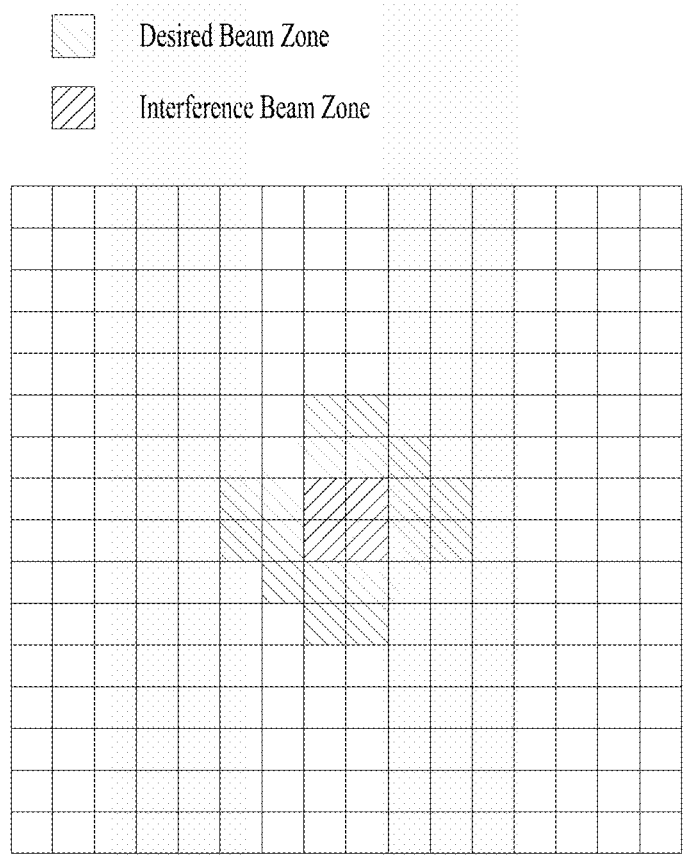
Figure 31:
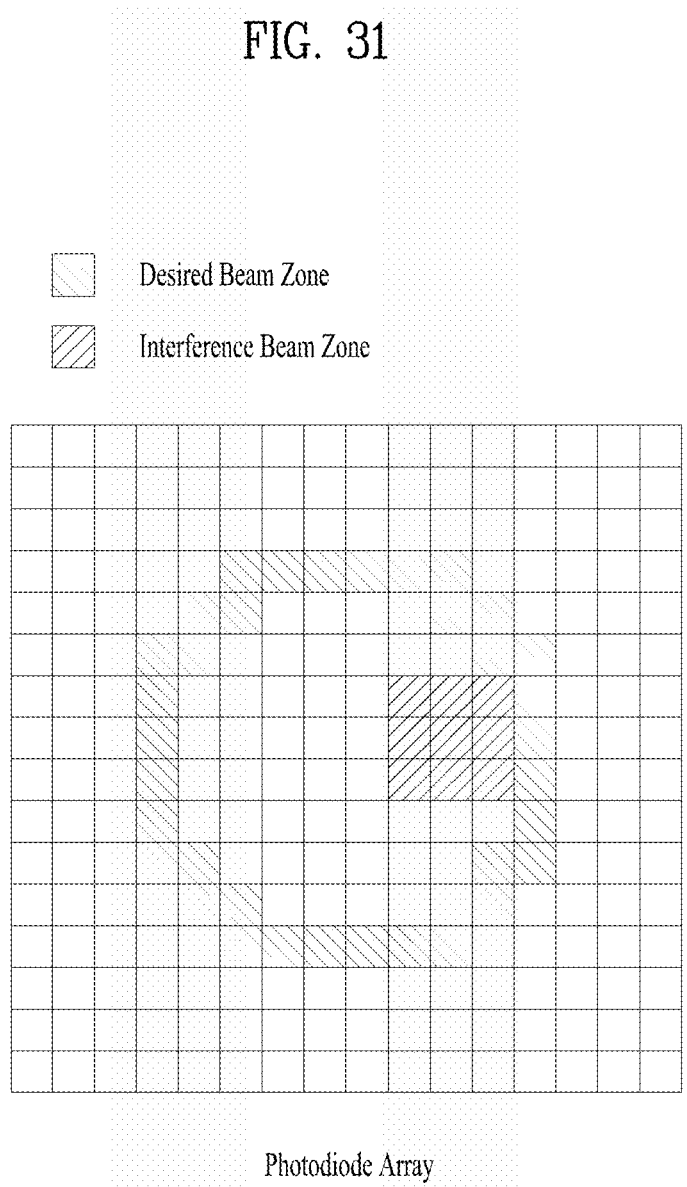

To increase or decrease the radius of the desired beam, the receiving UE may request to increase up the OAM mode index or decrease down the OAM mode index in the feedback information. For example, as shown in FIG. 30, when it is difficult to distinguish between the desired beam and interference beam and when the desired beam has a small radius, the receiving UE may request to increase up the OAM mode index up through feedback. As shown in FIG. 31, when the desired beam has an appropriate radius but the interference beam is tilted so that it is difficult to distinguish between the interference beam and the desired beam, the receiving UE may request to increase up the OAM mode index through feedback.

Figure 32:
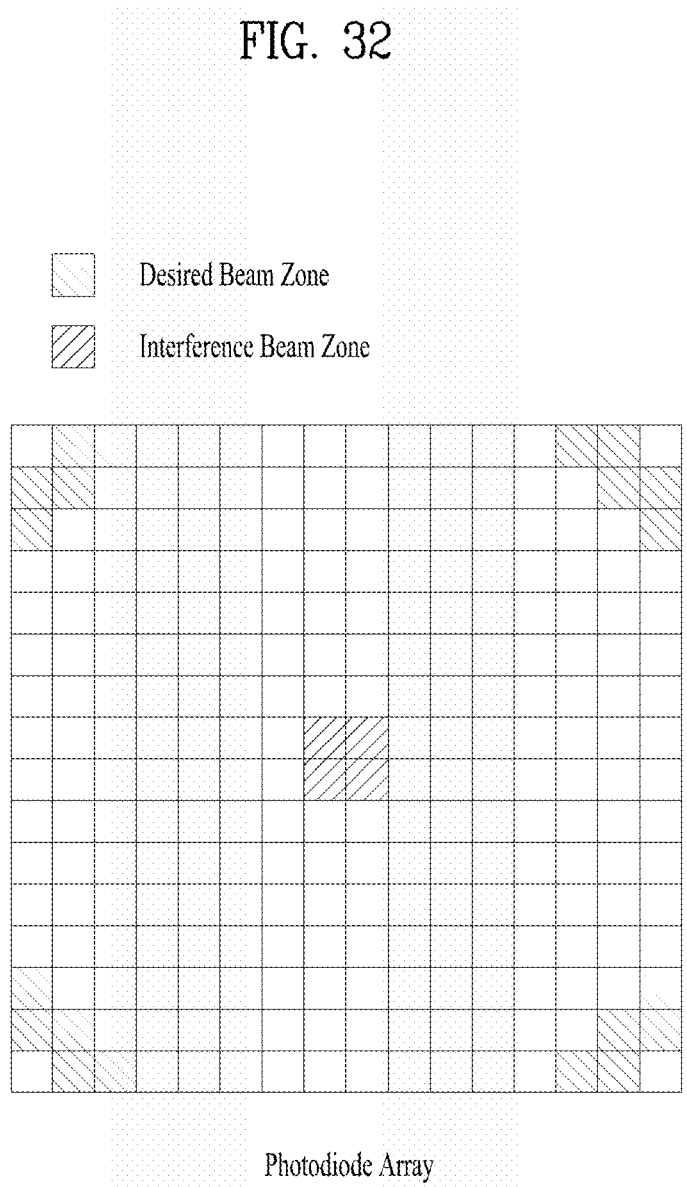
Figure 33:
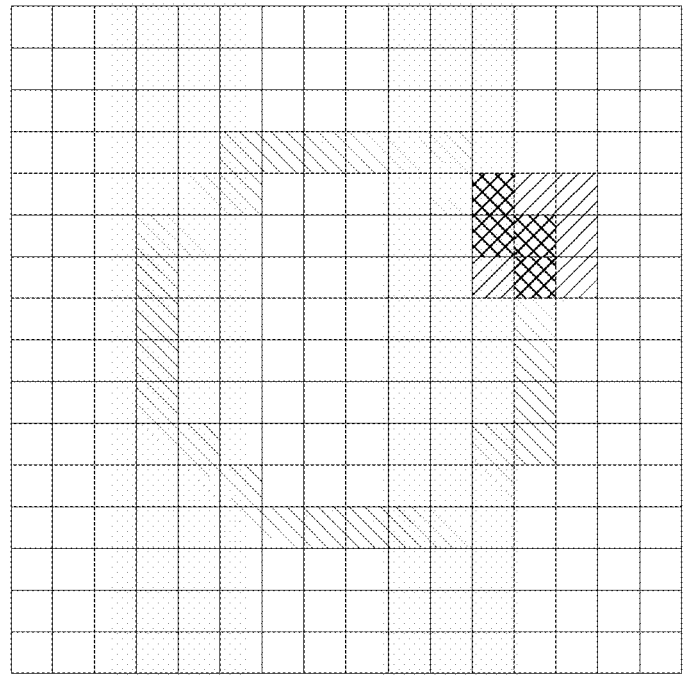
Figure 34:
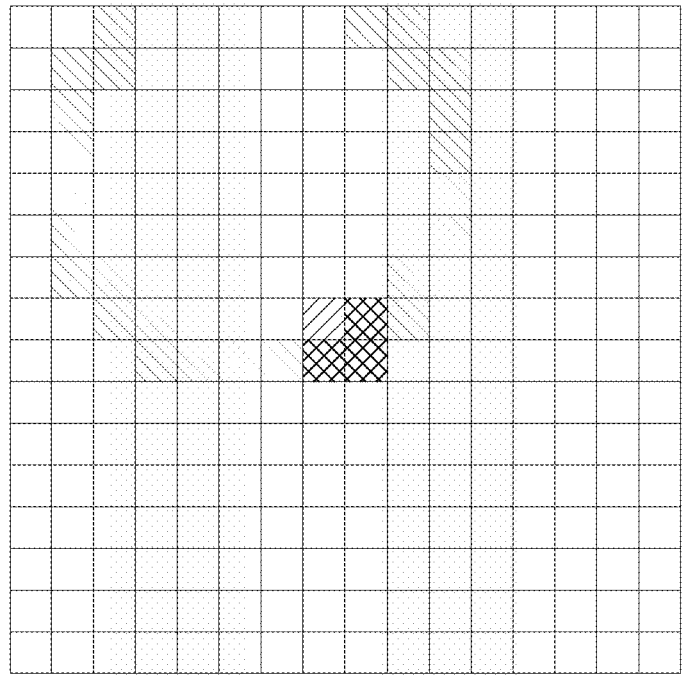

As shown in FIG. 32, when the desired beam has a large radius although the desired beam and interference beam are well distinguished, the receiving UE may request to decrease down the OAM mode index. As shown in FIG. 33, when the desired beam has an appropriate radius but the interference beam is tilted so that it is difficult to distinguish between the interference beam and the desired beam, the receiving UE may request to decrease down the OAM mode index through feedback because the desired beam may be out of the reception area if the receiving UE requests to increase up the OAM mode index. As shown in FIG. 34, when the desired beam is tilted and out of the reception area so that the desired beam is not well distinguished from the interference beam, the receiving UE may request to decrease down the OAM mode index through feedback.

The cases described above in FIGS. 30 to 34 may be agreed upon by predefined rules together with other unmentioned cases. For example, patterns between the desired and interference beams may be predefined in a lookup table, and OAM mode index up or down may be adaptively selected by comparison of a received pattern with the table.

Figure 35:
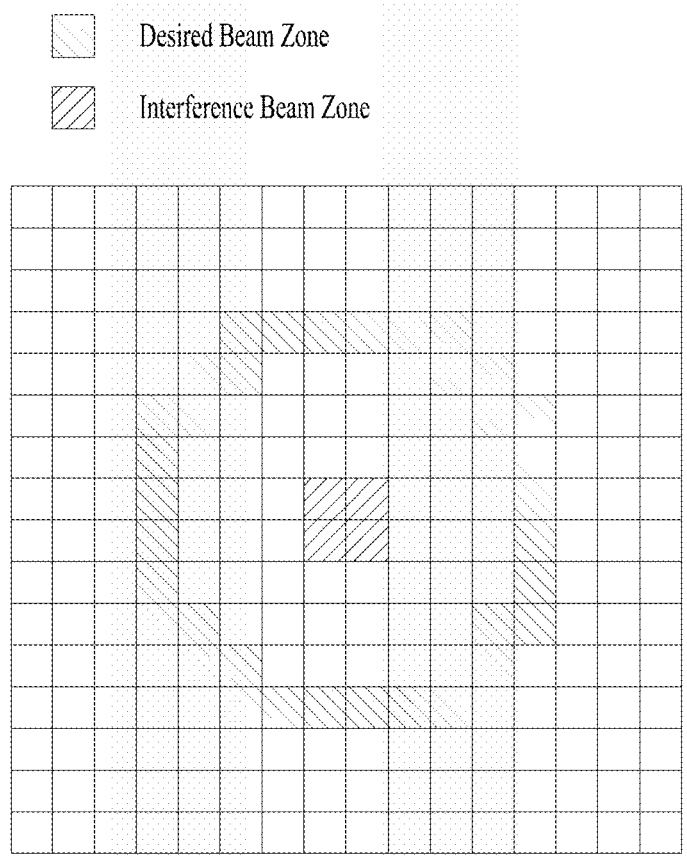

To maintain the current index of the desired beam, the receiving UE i) may not transmit feedback to the transmitting UE or ii) may feed back a predetermined field or index for maintaining the beam index. For example, as shown in FIG. 35, when the receiving UE is capable of well distinguishing the desired beam and interference beam, the receiving UE i) may not transmit feedback to the transmitting UE or ii) may feed back the predetermined field or index for maintaining the beam index.

4.6. The transmitting UE may perform OAM mode selection based on beam radius information fed back from the receiving UE.

4.7. The transmitting UE may generate an optical beam, for example, $TEM_{pl}$, based on the selected OAM mode index and transmit the optical beam to the receiving UE.

4.8. The receiving UE may receive the desired optical beam (e.g., $TEM_{pl}$) with the optical filter and the O-to-E device according to the method defined in Clause "2. Optical Wireless Communication Transmitter and Receiver Based on Photon OAM".

5. OAM Mode Selection Based on Sensing

Figure 36:
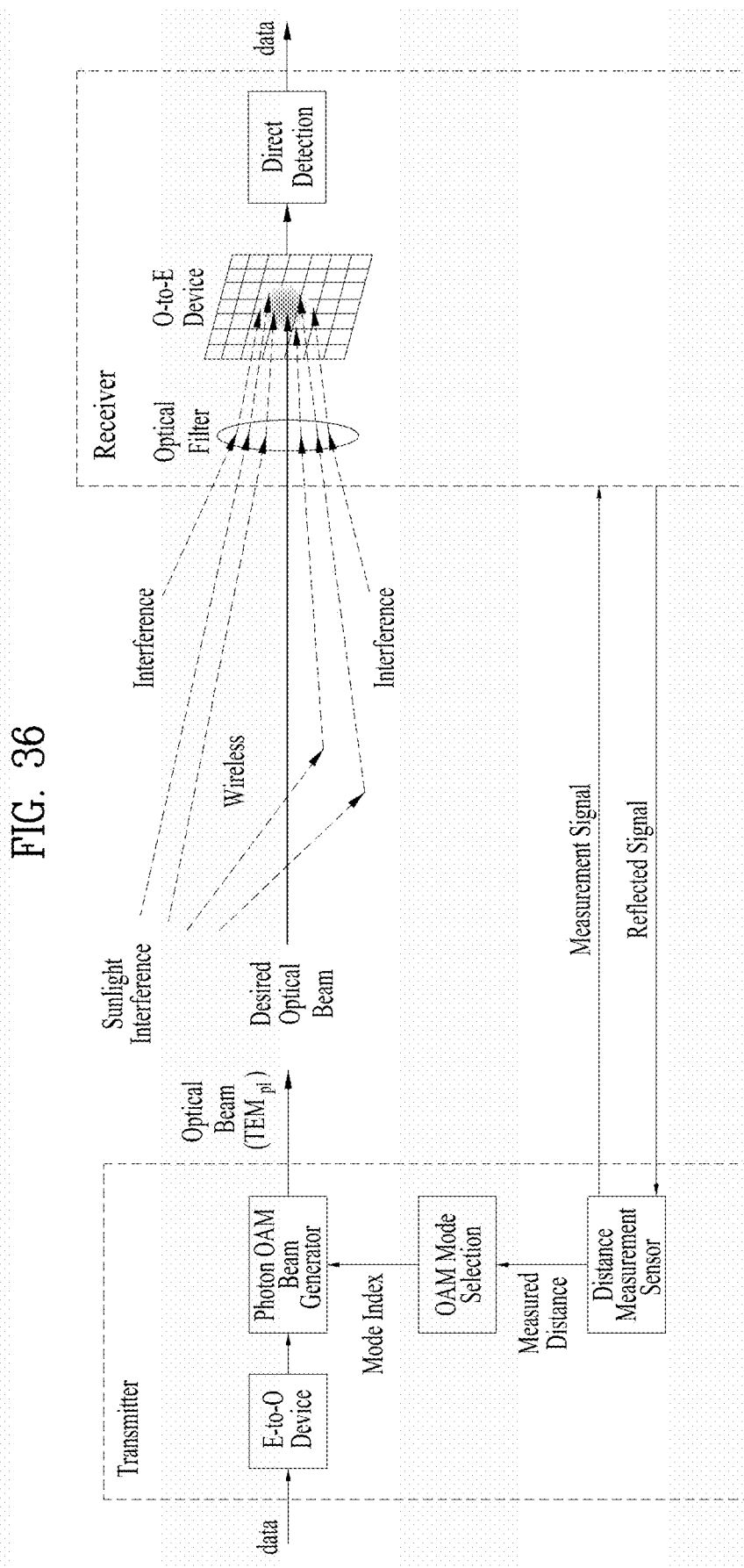
FIG. 36 is a diagram for explaining a sensing based OAM mode selection method in an optical wireless communication systems according to an example or implementation of the present disclosure.

FIG. 36 is a diagram illustrating a transmitting UE and a receiving UE according to an example or implementation of the present disclosure. Specifically, the transmitting UE may transmit data on a desired optical beam, for example, $TEM_{pl}$ according to the method defined in Clause "1. Optical Wireless Communication Transmission and Reception Procedure Based on Photon OAM". The transmitting UE may transmit a periodic (or aperiodic) reference signal in a manner agreed upon with the receiving UE when transmitting a desired beam The transmitting UE may measure the distance to the target receiving UE with a distance measurement sensor. The distance measurement sensor may include, for example, radio detection and ranging (RADAR) and/or light detection and ranging (LIDAR).

The transmitting UE may perform OAM mode selection based on information on the measured distance. In addition, the transmitting UE may generate an optical beam, for example, $TEM_{pl}$, based on the selected OAM mode index and transmit the optical beam to the receiving UE. The receiving UE may receive the desired optical beam (e.g., $TEM_{pl}$) with the optical filter and the O-to-E Device according to the method defined in Clause "2. Optical Wireless Communication Transmitter and Receiver Based on Photon OAM".

6. OAM Mode Selection Based on Feedback and Sensing

Figure 37:
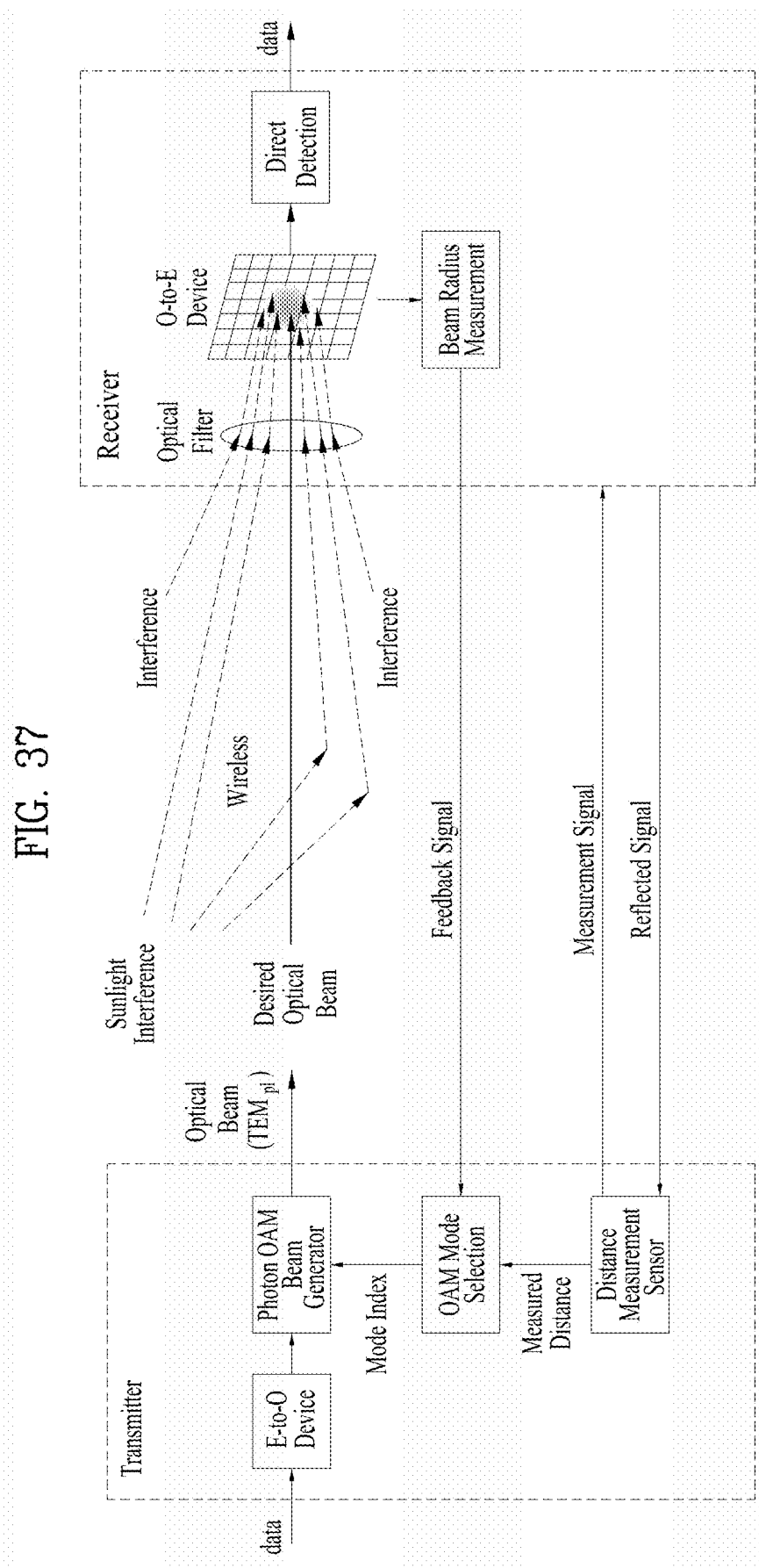
FIG. 37 is a diagram for explaining a feedback and sensing based OAM mode selection method in an optical wireless communication systems according to an example or implementation of the present disclosure.

FIG. 37 illustrates a transmitting UE and a receiving UE to which the aforementioned i) feedback-based OAM mode selection method and ii) sensing-based OAM mode selection method are applied together. Specifically, the transmitting UE may adaptively select an OAM mode index by applying feedback information from the receiving UE and distance information to the receiving UE measured by a distance measurement sensor together. According to an example or implementation of the present disclosure, the adaptively selected OAM mode index may be applied to data transmission as shown in FIG. 37, thereby improving the reception efficiency of the receiving UE.

Although the methods proposed above in Clauses 4, 5, and 6 are based on one desired beam and one interference beam, the methods may be applied in the same manner when there are multiple desired beams or multiple interference beams and when there are multiple desired beams and multiple interference beams. In this case, feedback information may be provided for each desired beam and each interference beam.

Figure 38:
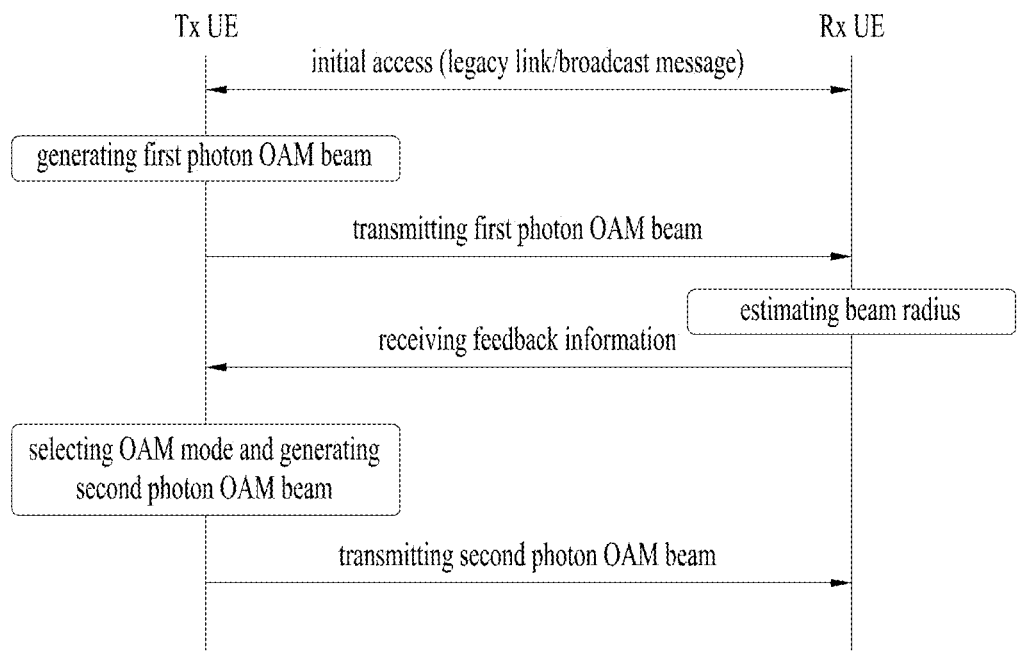
FIG. 38 is a diagram for explaining signal transmission and reception between a transmitting user equipment (UE) and a receiving UE in an optical wireless communication system according to an example or implementation of the present disclosure.

FIG. 38 is a diagram for explaining signal transmission and reception between a transmitting UE and a receiving UE in an optical wireless communication system according to an example or implementation of the present disclosure.

A method of transmitting a signal by a transmitting UE in an optical wireless communication system may include: transmitting a first optical signal including a reference signal to a receiving UE having a communication link established with the transmitting UE; receiving feedback information on the first optical signal from the receiving UE; and transmitting a second optical signal to the receiving UE based on the feedback information. In this case, an OAM mode of the second optical signal may be selected based on the feedback information.

The feedback information may include a radius of an area in which a desired signal is detected in a photodiode array of the receiving UE, and the OAM mode of the second optical signal may be selected based on the radius of the area.

A method of transmitting a signal by a transmitting UE in an optical wireless communication system may include: transmitting a first optical signal including a reference signal to a receiving UE having a communication link established with the transmitting UE; measuring a distance to the receiving UE with a distance measurement sensor; selecting an OAM mode of a second optical signal based on the measured distance; and transmitting the second optical signal to the receiving UE.

The distance measurement sensor may include radio detection and ranging (RADAR) or light detection and ranging (LIDAR).

A method of receiving a signal by a receiving UE in an optical wireless communication system may include: receiving a first optical signal including a reference signal from a transmitting UE having a communication link established; transmitting feedback information on the first optical signal to the transmitting UE; and receiving a second optical signal based on the feedback information from the transmitting UE.

The feedback information may be generated based on measuring a radius of a photodiode array area in which a desired signal is detected with respect to reference coordinates of a photodiode array.

The feedback information may be generated based on further measuring a radius of a photodiode array area in which an interference signal is detected with respect to the reference coordinates of the photodiode array.

The feedback information may include requesting an increase or decrease in an OAM mode index of the first optical signal.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

MODE FOR DISCLOSURE

Various embodiments of the disclosure have been described in the best mode for carrying out the disclosure.

The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is industrially applicable to various wireless communication systems such as 3GPP LTE/LTE-A and 5G systems.

What is claimed is:

1. A method of transmitting a signal by a transmitting user equipment (UE) in an optical wireless communication system, the method comprising:
    transmitting, to a receiving UE with a communication link established with the transmitting UE, a first optical signal including a reference signal;
    receiving, from the receiving UE, feedback information about the first optical signal; and
    transmitting, to the receiving UE, a second optical signal based on the feedback information,
    wherein an orbital angular momentum (OAM) mode of the second optical signal is selected based on the feedback information, and
    wherein the feedback information includes a radius of an area in which a desired signal is detected in a photodiode array of the receiving UE.

2. A method of transmitting a signal by a transmitting user equipment (UE) in an optical wireless communication system, the method comprising:
    transmitting, to a receiving UE with a communication link established with the transmitting UE, a first optical signal including a reference signal;
    receiving, from the receiving UE, feedback information about the first optical signal;
    measuring a distance to the receiving UE with a distance measurement sensor;
    selecting an orbital angular momentum (OAM) mode of a second optical signal based on the feedback information and the measured distance; and
    transmitting, to the receiving UE, the second optical signal,
    wherein the feedback information includes a radius of an area in which a desired signal is detected in a photodiode array of the receiving UE.

3. The method of claim 2, wherein the distance measurement sensor includes radio detection and ranging (RADAR) or light detection and ranging (LIDAR).

4. A method of receiving a signal by a receiving user equipment (UE) in an optical wireless communication system, the method comprising:
    receiving, from a transmitting UE with an established communication link, a first optical signal including a reference signal;
    transmitting, to the transmitting UE, feedback information on the first optical signal; and
    receiving, from the transmitting UE, a second optical signal based on the feedback information,
    wherein the feedback information is generated based on measuring a radius of a photodiode array area in which a desired signal is detected with respect to reference coordinates of a photodiode array.

5. The method of claim 4, wherein the feedback information is generated further based on measuring a radius of a photodiode array area in which an interference signal is detected with respect to the reference coordinates of the photodiode array.

6. The method of claim 4, wherein the feedback information includes requesting an increase or decrease in an orbital angular momentum (OAM) mode index of the first optical signal.

7. A transmitting user equipment (UE) configured to transmit a signal in an optical wireless communication system, the transmitting UE comprising:
    a transceiver; and
    a processor configured to:
    control the transceiver to transmit, to a receiving UE with a communication link established with the transmitting UE, a first optical signal including a reference signal;
    control the transceiver to receive, from the receiving UE, feedback information on the first optical signal; and
    control the transceiver to transmit, to the receiving UE, a second optical signal based on the feedback information,
    wherein an orbital angular momentum (OAM) mode of the second optical signal is selected based on the feedback information, and
    wherein the feedback information includes a radius of an area in which a desired signal is detected in a photodiode array of the receiving UE.

8. A transmitting user equipment (UE) configured to transmit a signal in an optical wireless communication system, the transmitting UE comprising:
    a transceiver; and
    a processor configured to:
    control the transceiver to transmit, to a receiving UE with a communication link established with the transmitting UE, a first optical signal including a reference signal;
    control the transceiver to receive, from the receiving UE, feedback information on the first optical signal;
    measure a distance to the receiving UE with a distance measurement sensor;
    select an orbital angular momentum (OAM) mode of a second optical signal based on the feedback information and the measured distance; and
    control the transceiver to transmit, to the receiving UE, the second optical signal,
    wherein the feedback information includes a radius of an area in which a desired signal is detected in a photodiode array of the receiving UE.

9. The transmitting UE of claim 8, wherein the distance measurement sensor includes radio detection and ranging (RADAR) or light detection and ranging (LIDAR).

10. A receiving user equipment (UE) configured to receive a signal in an optical wireless communication system, the receiving UE comprising:
    a transceiver; and
    a processor configured to:
    control the transceiver to receive, from a transmitting UE with an established communication link, a first optical signal including a reference signal;
    control the transceiver to transmit, to the transmitting UE, feedback information on the first optical signal;
    control the transceiver to receive, from the transmitting UE, a second optical signal based on the feedback information; and
    generate the feedback information based on measuring a radius of a photodiode array area in which a desired signal is detected with respect to reference coordinates of a photodiode array.

11. The receiving UE of claim 10, wherein the processor is configured to generate the feedback information further based on measuring a radius of a photodiode array area in which an interference signal is detected with respect to the reference coordinates of the photodiode array.

12. The receiving UE of claim 10, wherein the feedback information includes requesting an increase or decrease in an orbital angular momentum (OAM) mode index of the first optical signal.

* * * * *